United States Patent
Jochum et al.

(10) Patent No.: US 12,036,698 B2
(45) Date of Patent: Jul. 16, 2024

(54) SYSTEM AND METHOD FOR CONTROLLING FLOW DISTRIBUTION OF EXTRUDATE SOURCE MATERIAL FOR FABRICATING A HONEYCOMB EXTRUDATE

(71) Applicant: Corning Incorporated, Corning, NY (US)

(72) Inventors: Dustin Andrew Jochum, Corning, NY (US); Daniel Edward McCauley, Horseheads, NY (US); Casey Allen Volino, Tioga, PA (US)

(73) Assignee: Corning Incorporated, Corning, NY (US)

( * ) Notice: Subject to any disclaimer, the term of this patent is extended or adjusted under 35 U.S.C. 154(b) by 959 days.

(21) Appl. No.: 16/810,081

(22) Filed: Mar. 5, 2020

(65) Prior Publication Data

US 2020/0298442 A1    Sep. 24, 2020

Related U.S. Application Data

(60) Provisional application No. 62/819,775, filed on Mar. 18, 2019.

(51) Int. Cl.
*B28B 3/26* (2006.01)
*B29C 48/11* (2019.01)
(Continued)

(52) U.S. Cl.
CPC .............. *B28B 3/269* (2013.01); *B29C 48/11* (2019.02); *B29C 48/2556* (2019.02);
(Continued)

(58) Field of Classification Search
CPC ... B29C 48/11; B29C 48/255; B29C 48/2556; B29C 48/705; B28B 3/2672; B28B 3/269; C04B 38/0006
See application file for complete search history.

(56) References Cited

U.S. PATENT DOCUMENTS 4,668,176 A    5/1987  Zeibig et al.
6,039,908 A *  3/2000  Brew .................... B28B 3/2672
                                                    264/209.8

(Continued)

FOREIGN PATENT DOCUMENTS

EP    1125704 B1    5/2006
EP    3192631 A1    7/2017

*Primary Examiner* — Xiao S Zhao
*Assistant Examiner* — Joseph S Leyson
(74) *Attorney, Agent, or Firm* — Daniel J. Greenhalgh

(57) ABSTRACT

A system for controlling center-to-outer flow distribution of extrudate source material through an extrusion die suitable for production of a honeycomb extrudate, and a method for fabricating a honeycomb extrudate, are provided. Sequentially arranged first and second plates define first and second pluralities of openings through which extrudate source material may flow, wherein at least some openings of the second plurality of openings arranged at different radial positions differ in area. Relative movement between the first plate and the second plate may be effectuated to adjust overlap between corresponding openings of the plates, thereby adjusting a center-to-outer flow distribution of extrudate source material through an extrusion die arranged downstream of the first and second plates.

16 Claims, 20 Drawing Sheets

(51) Int. Cl.
  *B29C 48/255* (2019.01)
  *B29C 48/30* (2019.01)
  *B29C 48/70* (2019.01)
  *C04B 38/00* (2006.01)

(52) U.S. Cl.
  CPC .......... *B29C 48/302* (2019.02); *B29C 48/705* (2019.02); *B28B 3/2681* (2013.01); *C04B 38/0006* (2013.01)

(56) References Cited

U.S. PATENT DOCUMENTS

| | | |
|---|---|---|
| 6,663,378 B2 | 12/2003 | Grover et al. |
| 7,303,782 B2 | 12/2007 | Avery et al. |
| 7,655,195 B1 | 2/2010 | Ichikawa et al. |
| 8,398,390 B2 | 3/2013 | Hayashi et al. |
| 8,672,660 B2 | 3/2014 | Citriniti et al. |
| 9,393,716 B2 | 7/2016 | Beecher et al. |
| 11,031,885 B1 * | 6/2021 | Yavid ............... F42B 12/02 |
| 2004/0164464 A1 | 8/2004 | Lubberts et al. |
| 2017/0197349 A1 * | 7/2017 | Ito ..................... B28B 3/269 |
| 2018/0043595 A1 | 2/2018 | Imaizumi et al. |

* cited by examiner

SYSTEM AND METHOD FOR CONTROLLING FLOW DISTRIBUTION OF EXTRUDATE SOURCE MATERIAL FOR FABRICATING A HONEYCOMB EXTRUDATE

This application claims the benefit of priority under 35 U.S.C. § 119 of U.S. Provisional Application No. 62/819,775 filed on Mar. 18, 2019, the content of which is incorporated herein by reference in its entirety.

BACKGROUND

This disclosure relates generally to systems and methods for controlling flow distribution of extrudate source material, and more particularly to systems and methods for adjusting center-to-outer flow distribution of source material through an extrusion die, such as may be useful for producing a honeycomb extrudate.

Exhaust produced by the combustion of liquid fuels (e.g., diesel or gasoline) can be effectively treated by catalytic converter substrates and/or particulate filters such as wall-flow particulate filters. Filters and catalyst supports in these applications may be refractory, thermal shock resistant, and offer low resistance to exhaust gas flow. Particulate filters and substrates for these applications advantageously may be fabricated of porous ceramic material that are light in weight and may be provided in the form of a honeycomb structure, which (in the case of a particulate filter) may include a plurality of plugs that seal certain channels.

Ceramic honeycomb structures may be fabricated by plasticizing a ceramic powder batch mixture to form a wet extrudate source material, extruding the source material through a honeycomb extrusion die to form honeycomb extrudate, and cutting, drying, and firing the extrudate to produce ceramic honeycomb bodies. These ceramic honeycomb bodies may be used as ceramic catalyst supports in motor vehicle exhaust systems, and as catalyst supports and wall-flow particulate filters for removing soot and other particulates from engine exhaust streams.

After a ceramic honeycomb body has been dried, the body may be inspected to seek to identify defects. Defects may include voids in certain areas of a honeycomb body due to uneven distribution of extrudate source material through an extrusion die. It can be difficult and time-consuming, however, to adjust a center-to-outer flow distribution of extrudate source material. Moreover, when a defect is found, it may be too late to correct an extrusion process that caused the defect in sequential parts formed from the same extrudate source material in the same production run. In some instances, defective honeycomb bodies may be corrected (requiring additional labor, time, and cost), but in other instances defects in honeycomb bodies may be irreparable, thereby reducing production yield and manufacturing efficiency.

A need exists for systems and methods that address the foregoing concerns.

SUMMARY

Disclosed herein are a system for controlling center-to-outer flow distribution of extrudate source material through an extrusion die suitable for production of a honeycomb extrudate, and a method for fabricating a honeycomb extrudate. The system and method utilize a first plate defining a first plurality of openings and a second plate defining a second plurality of openings, wherein at least some openings of the second plurality of openings arranged at different radial positions differ in area. Extrudate source material is flowable through a serial flow path including the first plurality of openings and the second plurality of openings. Relative movement (e.g., lateral translation or rotation) between the first plate and the second plate may be effectuated to adjust overlap between corresponding openings defined in the first and second plates, thereby adjusting a center-to-outer flow distribution of extrudate source material through an extrusion die arranged downstream of the first plate and the second plate.

In one aspect, the disclosure relates to a system for controlling flow distribution of an extrudate source material upstream of an extrusion die configured for production of a honeycomb extrudate. The system comprises a first plate defining a first plurality of openings and a second plate defining a second plurality of openings, wherein at least some openings of the second plurality of openings arranged at different radial positions differ in area. The first plate and the second plate are arranged in series in a flow path of extrudate source material to cause the extrudate source material to flow through either (i) the first plurality of openings followed by the second plurality of openings, or (ii) the second plurality of openings followed by the first plurality of openings. At least one of the first plate or the second plate is configured to move relative to the other, and relative movement between the first plate and the second plate is configured to adjust a center-to-outer flow distribution of the extrudate source material through the extrusion die.

In certain embodiments, openings of the second plurality of openings are distributed among a central zone, a peripheral zone, and at least one intermediate zone that is arranged between the central zone and the peripheral zone, with each of the peripheral zone and the at least one intermediate zone surrounding the central zone.

In certain embodiments, individual openings of the second plurality of openings arranged in the peripheral zone are larger than individual openings of the second plurality of openings arranged in the at least one intermediate zone, and individual openings of the second plurality of openings arranged in the at least one intermediate zone are larger than individual openings of the second plurality of openings arranged in the central zone.

In certain embodiments, wherein the at least one intermediate zone comprises a plurality of intermediate zones including an outermost intermediate zone and an innermost intermediate zone, and wherein the outermost intermediate zone comprises individual openings of the second plurality of openings that are larger than individual openings of the second plurality of openings provided in the innermost intermediate zone.

In certain embodiments, individual openings of the second plurality of openings arranged in the central zone are circular in shape, and individual openings of the second plurality of openings arranged in the peripheral zone and arranged in the at least one intermediate zone comprise geometric stadium shapes.

In certain embodiments, each of the first plate and the second plate extends across substantially an entire width of a single flow path of the extrudate source material upstream of the extrusion die.

In certain embodiments, wherein at least one of the first plate or the second plate is configured to move relative to the other by translation in a lateral direction that is perpendicular to a direction of flow of extrudate source material through the first plurality of openings and the second plurality of openings.

In certain embodiments, the system is configured to move at least one of the first plate or the second plate relative to the other by rotation.

In certain embodiments, the system further comprises at least one mechanism configured to move one of the first plate or the second plate.

In certain embodiments, each of the first plate and the second plate is substantially circular in shape.

In another aspect, the disclosure relates to a method for fabricating a honeycomb extrudate. The method comprises flowing an extrudate source material through a serial flow path including a first plurality of openings defined in a first plate and including a second plurality of openings defined in a second plate, wherein at least some openings of the second plurality of openings arranged at different radial positions differ in area. The method further comprises effectuating relative movement between the first plate and the second plate to adjust a center-to-outer flow distribution of extrudate source material through an extrusion die arranged downstream of the first plate and the second plate.

In certain embodiments, the extrudate source material comprises a ceramic material.

In certain embodiments, the serial flow path causes the extrudate source material to flow through the first plurality of openings followed by the second plurality of openings.

In certain embodiments, the serial flow path causes the extrudate source material to flow through the second plurality of openings followed by the first plurality of openings.

In certain embodiments, openings of the second plurality of openings are distributed among a central zone, a peripheral zone, and at least one intermediate zone that is arranged between the central zone and the peripheral zone, with each of the peripheral zone and the at least one intermediate zone surrounding the central zone.

In certain embodiments, individual openings of the second plurality of openings arranged in the peripheral zone are larger than individual openings of the second plurality of openings arranged in the at least one intermediate zone, and individual openings of the second plurality of openings arranged in the at least one intermediate zone are larger than individual openings of the second plurality of openings arranged in the central zone.

In certain embodiments, the at least one intermediate zone comprises a plurality of intermediate zones including an outermost intermediate zone and an innermost intermediate zone, and wherein the outermost intermediate zone comprises individual openings of the second plurality of openings that are larger than individual openings of the second plurality of openings provided in the innermost intermediate zone.

In certain embodiments, each of the first plate and the second plate extends across substantially an entire width of a single flow path of the extrudate source material upstream of the extrusion die.

In certain embodiments, the effectuating of relative movement between the first plate and the second plate comprises translating one of the first plate or the second plate in a lateral direction that is perpendicular to a direction of flow of extrudate source material through the first plurality of openings and the second plurality of openings.

In certain embodiments, wherein the effectuating of relative movement between the first plate and the second plate comprises rotating at least one of the first plate or the second plate relative to the other.

In another aspect, any two or more of the foregoing aspects or embodiments or other features disclosed herein may be combined for additional advantage.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
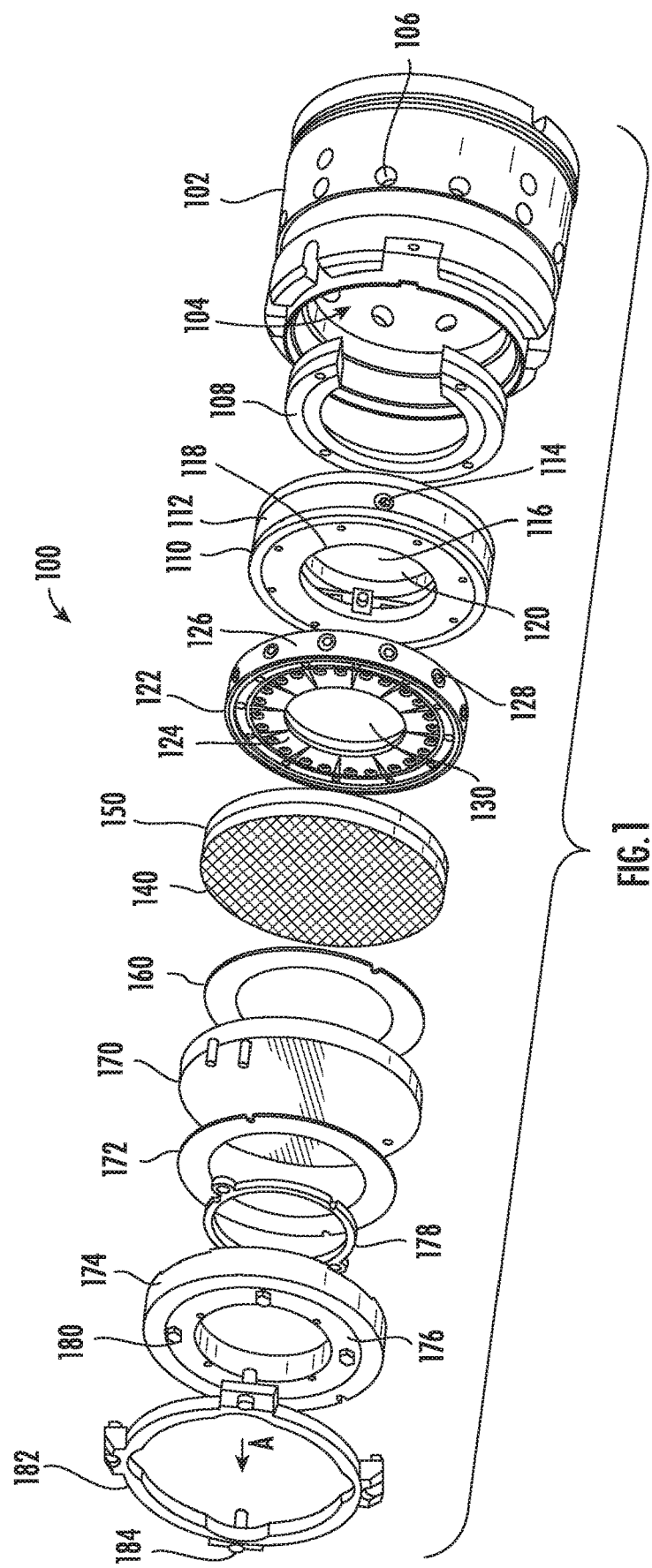
FIG. 1 is an exploded perspective view illustration of components of an extruder front end including overlapping first and second plates that are perforated with openings extending therethrough, with at least one plate being moveable to permit adjustment of center-to-outer flow distribution of extrudate source material.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element or region to another element or region as illustrated in the accompanying drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, the term "extrudate" refers to plasticized extrusion source material (also known as batch material) extruded through a die to form axially extending intersecting walls with channels arranged therebetween. Channels of an extrudate can have cross-sections of uniform or varying hydraulic diameter of various shapes, such as rectangular (e.g., square), hexagonal, other polygonal, circular, elliptical, other curved shapes and the like, and combinations thereof. Extrusion may entail a continuous process (e.g., utilizing a screw extruder, a twin-screw extruder, or the like) or a discontinuous process (e.g., utilizing a ram extruder or the like). In an extruder, an extrusion die can be coupled with a discharge port of an extruder barrel, such as at an end of the extruder barrel. An extrusion die can be preceded by other structures, such as a generally open cavity, a screen, and/or a homogenizer or the like to facilitate the formation of a steady plug-type flow front before the extrusion source material reaches the extrusion die.

Extrudate may include a co-extruded, integrally formed, outer peripheral surface (or skin) that typically extends in a longitudinal direction parallel to an axial direction of formation of the extrudate. An outer periphery of extrudate may have various cross-sectional shapes, such as circular, elliptical, polygonal, etc., and combinations thereof, and such shapes may be either symmetric or asymmetric in character. Plasticized extrusion source material (or batch material) may comprise inorganic powders, inorganic binders, organic binders, pore formers, solvents, non-solvents, and the like. After plasticized extrusion source material is extruded through a die to form extrudate, the extrudate may be cut, dried, and fired to form a porous ceramic honeycomb body or porous ceramic honeycomb body segment.

Disclosed herein are a system for controlling center-to-outer flow distribution of extrudate source material through an extrusion die suitable for production of a honeycomb extrudate, and a method for fabricating a honeycomb extrudate. Such a system and method utilize a first plate that defines a first plurality of openings and a second plate that defines a second plurality of openings, wherein at least some openings of the second plurality of openings arranged at different radial positions differ in area. Extrudate source material is flowable through a serial flow path including the first plurality of openings and the second plurality of openings. Relative movement between the first plate and the second plate may be effectuated to adjust overlap between corresponding openings defined in the first and second plate, thereby adjusting a center-to-outer flow distribution of extrudate source material through an extrusion die arranged downstream of the first plate and the second plate. Such relative movement between the first and second plates may include lateral translation or rotation of one plate relative to the other.

Consistent and repeatable extrusion of honeycomb bodies and honeycomb body segments with extruded skin is a complicated process. Common problems that are desirably avoided include (but are not limited to) inconsistent skin thickness, voids in one or more areas of the skin, and voids in one or more areas of internal intersecting walls bounding channels within a honeycomb body.

In certain embodiments, the disclosed system for controlling center-to-outer flow distribution of extrudate source material may be used in combination with numerous other components of an extrusion apparatus 100, such as shown in FIG. 1. The extrusion apparatus 100 includes a generally cylindrical cartridge body 102 defining a cavity 104 in which various items may be housed and supported. The cartridge body 102 may include peripheral access holes 106 to provide access to adjustors on items within the cartridge body 102. An aperture ring 108 (optionally having an open C-shape) may be arranged within the cavity 104 of the cartridge body 102 to provide a chamber space and aperture for plasticized extrusion source material.

An extrudate bow corrector apparatus 110 may be provided adjacent to the aperture ring 108. Examples of extrudate bow corrector devices for correcting bow in a stream of extruded material are provided in U.S. Pat. No. 9,393,716, in U.S. Pat. No. 6,663,378, and in U.S. Patent Application Publication No. 2004/0164464, wherein each of the foregoing patents and publication are hereby incorporated by reference herein in their entireties. The bow corrector apparatus 110 illustrated in FIG. 1 may include a base 112, a horizontal adjustment member 114, a horizontal connector, a vertical adjustment member, a vertical connector, and a bow plate. The base 112 defines a base aperture 120 through which a plasticized extrudate source material flows. The bow plate is movably mounted to the base 112; in different embodiments, it may be movably mounted to either a downstream or upstream side of the base 112. The bow plate has a bow plate opening 116 defined by an edge 118 adjacent to the base aperture 120. The bow plate opening 116 can be directly adjacent to the base aperture 120. The bow plate opening 116 can be a constant area and can have an inner edge corresponding to the shape of the product being extruded. The bow plate opening 116 can be of the same or different size of the base aperture 120. For example, the bow plate opening 116 can be smaller in size than the base aperture 120. The bow plate permits extrudate source material to flow solely through the bow plate opening 116.

The horizontal adjustment member 114 located on a side of the base 112 controls horizontal movement of the bow plate relative to the base 112. The horizontal adjustment member 114 can be connected to a side of the bow plate. For example, the horizontal adjustment member 114 may include a threaded bolt or rod that pushes and pulls an outer peripheral edge of the bow plate. A corresponding vertical adjustment member (not shown, but identical to the above-described adjustment member 114) may be located on a top of the base 112 in FIG. 1, to control vertical movement of the bow plate. For example, the vertical adjustment member may include a threaded bolt or rod that pushes and pulls an outer peripheral edge of the bow plate. The horizontal and vertical adjustment members 114 can be externally manipulated along an exterior of the bow corrector apparatus 110 to allow for external manipulation during production without interruption thereof. The adjustment members 114 may be adjusted mechanically (e.g., by rotation of bolt heads coupled with threaded shafts) or by pneumatic or hydraulic devices (not shown). Adjustment of the horizontal and vertical adjustment members 114 connected to the side and top of the bow plate, respectively, cause movement of the bow plate. When the bow plate moves in a horizontal direction, the bow plate opening 116 moves in a horizontal direction. Likewise, when the bow plate moves in a vertical direction, the bow plate opening 116 moves in a vertical direction. Accordingly, the bow plate opening 116 can move horizontally and vertically relative to the base 112 while maintaining a constant opening size (area) and shape. Positional adjustment of the bow plate opening 116 opening affects both the direction and the magnitude of bowing that can be corrected in extrudate produced by the extrusion apparatus 100.

Downstream of the bow corrector apparatus 110 is an infinitely variable externally controllable flow plate ("flow plate") 122 capable of adjusting differences in skin-body flow rates at multiple locations around a perimeter of an extrudate. The flow plate 122 includes multiple moveable segments 124 (e.g., six to twelve in number) each having a wedge-like shape and arranged to move in a radial direction relative to a peripheral ring 126. Position of each moveable segment 124 may be controlled by an adjustment mechanism 128, which may include a threaded bolt, a boss, a piston, a solenoid, a motor, or the like. In combination, the moveable segments 124 bound a flow plate opening 130 through which extrudate source material may flow. The flow plate 122 allows for external manipulation of the interior components controlling flow of extrudate source material during the production of an extrudate without having to stop manufacturing operations to effect the process changes. The multiple moveable segments 124 of the flow plate 122 permit adjustment of flow of extrudate source material at multiple locations along a perimeter of an extrudate, such as may be useful to ensure that peripheral portions of a resulting extrudate have uniform thickness and are free of voids. In certain embodiments, optical sensors (not shown) may be arranged downstream of an extruder apparatus to monitor an outer peripheral surface (or skin) of extrudate for defects (e.g., voids), and moveable segments 124 of the flow plate 122 may be adjusted responsive to signals received from the sensors to achieve a desired quality and/or uniformity. More details regarding the flow plate 122, optical sensors, and feedback control schemes are provided in U.S. Patent Application Publication No. 2017/0355102, which is hereby incorporated by reference herein.

Downstream of the flow plate 122 are first and second plates 140, 150 that each define a plurality of openings (e.g., openings 142 in the first plate 140) extending therethrough. The first plate 140 and the second plate 150 are illustrated in greater detail in FIGS. 2 and 3A, and will be described in further detail hereinafter. Briefly, the first plate 140 defines a first plurality of openings and the second plate defines a second plurality of openings, wherein at least some openings of the second plurality of openings arranged at different radial positions differ in area. Relative movement (e.g., lateral translation or rotation) between the first plate 140 and the second plate 150 may be effectuated to adjust overlap between corresponding openings defined in the first and second plates 140, 150, thereby adjusting a center-to-outer flow distribution of extrudate source material through an extrusion die 170 arranged downstream of the first and second plates 140, 150. In certain embodiments, use of the first and second plates 140, 150 may be complementary to the flow plate 122.

The extrusion die 170, which is arranged downstream of the first and second plates 140, 150, includes openings defined therethrough for passage of extrudate source material to form a honeycomb extrudate. Optionally, various shims 160, 172 may be provided proximate to opposing faces of the extrusion die 170 to hold the extrusion die 170 in place. Downstream of the extrusion die 170, a mask support 174 supports an adjustment ring 176 with adjustors 180, which may include bolts, bosses, pistons, or the like, to move the adjustment ring 176 toward and away from the extrusion die 170 in an axial direction parallel to flow of extrudate from the extrusion die 170. A mask ring 178 is provided between the mask support 174 and the extrusion die 170. When extrudate from the extrusion die 170 encounters the mask ring 178, skin is formed integral with a matrix of the extrudate. A spider ring 182 secured with fasteners 184 may be arranged proximate to the mask support 174 and used to retain various components of the extrusion apparatus 100 in the cartridge body 102.

Upon exiting the extrusion apparatus 100 in direction of arrow "A" (axial direction), the plasticized extrusion source material stiffens into a wet extrudate that comprises a network of axially extending intersecting walls (or webs) that form axially extending channels and an axially extending outer peripheral surface, with the webs and channels comprising a matrix.

While the first and second plates 140, 150 have been illustrated in FIG. 1 and described as being disposed within the cartridge body 102 with various other components, the present disclosure also encompasses embodiments in which the cartridge body 102 and/or any one or more other components illustrated in FIG. 1 are not present.

Upon formation of extrudate using the extrusion apparatus 100, an extrudate may pass through an inline inspection and control system that can inspect the extruduate in situ. In certain embodiments, an inline inspection and control system may include an inspection unit having one or more sensors to inspect one or more properties (e.g., surface quality, web integrity, overall extrudate shape quality, etc.) of extrudate received from the extrusion apparatus 100. In certain embodiments, one or more light sources in conjunction with one or more axial optical sensors (such a charge-coupled device (CCD), camera, or the like) may image an end face of an extrudate or extrudate segment produced by the extrusion apparatus 100 to assess web integrity, web uniformity, skin integrity, skin uniformity, overall extrudate shape, or the like. In certain embodiments, one or more additional light sources in conjunction with one or more peripheral optical sensors may be arranged around a perimeter of an extrudate or extrudate segment to assess skin integrity, skin uniformity, skin surface quality, overall extrudate shape, or the like.

The extrusion apparatus 100 may be utilized in a method for fabricating a honeycomb extrudate. Such a method may comprise flowing an extrudate source material through a serial flow path that includes a first plurality of openings 142 defined in the first plate 140 and that includes a second plurality of openings 152 defined in a second plate 150, wherein at least some openings 152A-152F of the second plurality of openings 152 defined in the second plate 150 arranged at different radial positions differ in area. Such a method may further comprise effectuating relative movement between the first plate 140 and the second plate 150 (e.g., lateral translation and/or rotation) to adjust a center-to-outer flow distribution of extrudate source material through an extrusion die 170 arranged downstream of the first and the second plates 140, 150.

Further details of the first and second plates 140, 150 illustrated in FIG. 1 will now be described. The first and second plates 140, 150 may be fabricated of any suitably rigid and durable materials such as hardened steel or titanium, optionally including a wear-resistant coating formed by nitriding (e.g., titanium nitride) or other materials to resist erosion due to passage of extrusion source material, which may be abrasive in character. In certain embodiments, the first and second plates 140, 150 may be fabricated by machining (e.g., milling), electron discharge machining, laser drilling, etching, and/or any other suitable technique.

Figure 2:
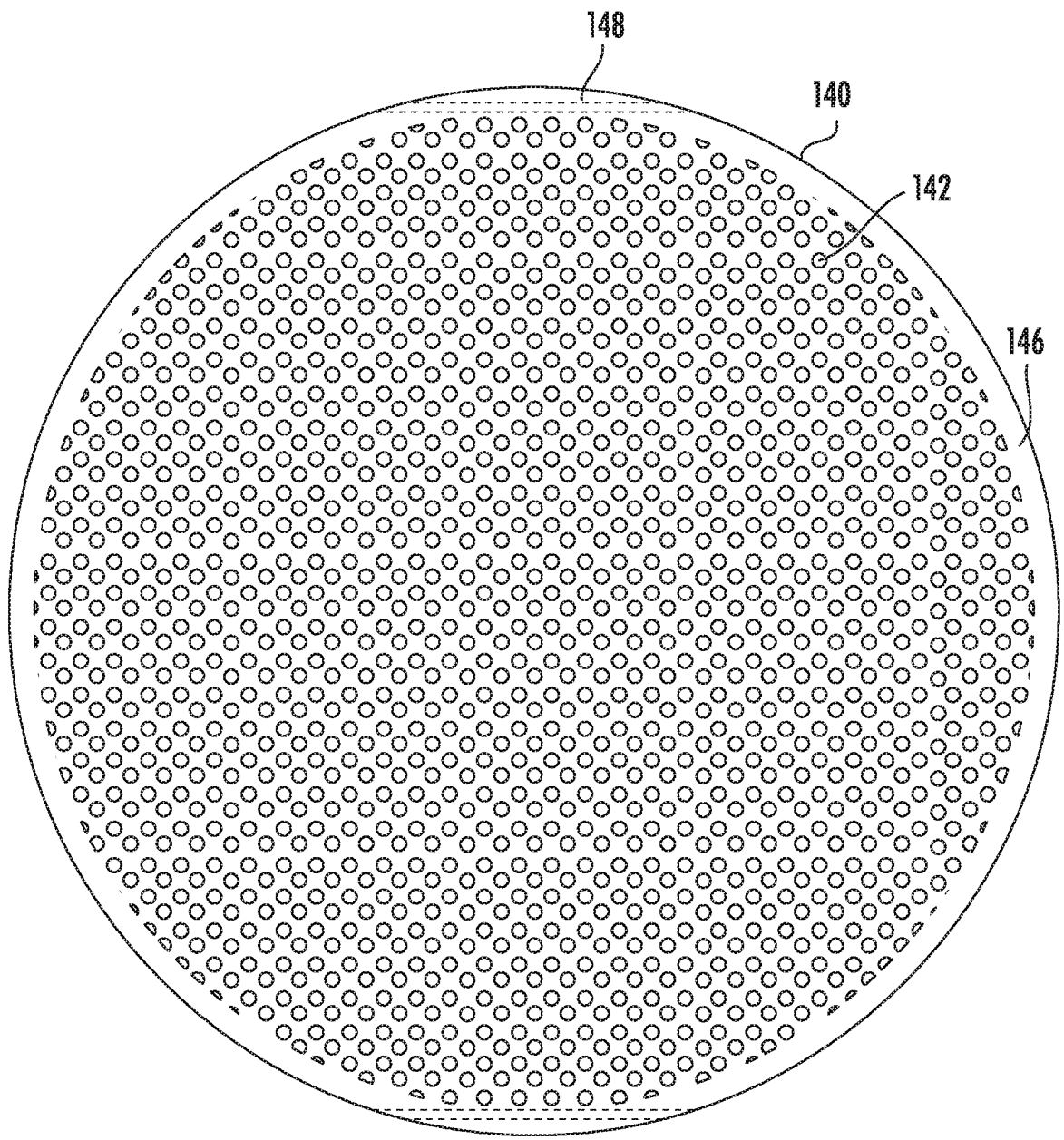
FIG. 2 is a front elevational view of a first plate defining a first plurality of equally-sized round openings therethrough, with the openings being distributed in a substantially uniform manner over a face of the first plate.

FIG. 2 is a front elevational view of the first plate 140, which is round in shape and includes a first plurality of openings 142 defined therethrough, with such openings 142 being round and substantially equal in size. As shown, the first plurality of openings 142 are distributed in a substantially uniform manner over a face of the first plate 140, except over a peripheral region 146 of the first plate 140 that is devoid of openings. Optionally, protrusions or channels 148 may be arranged along opposing segments of the peripheral region 146, wherein the protrusions or channels 148 may be used to guide lateral translation between the first plate 140 and the second plate 150 (shown in FIGS. 1 and 3A). As illustrated, a row of about thirty openings 142 are distributed across a width of the first plate 140 at its widest point, but any suitable number and spacing of openings may be provided. In certain embodiments, the first plate 140 may include openings 142 that are substantially identical in size, shape, and spacing to corresponding openings defined in an extrusion die (e.g., extrusion die 170 shown in FIG. 1) arranged downstream of the first plate 140.

Figure 3A:
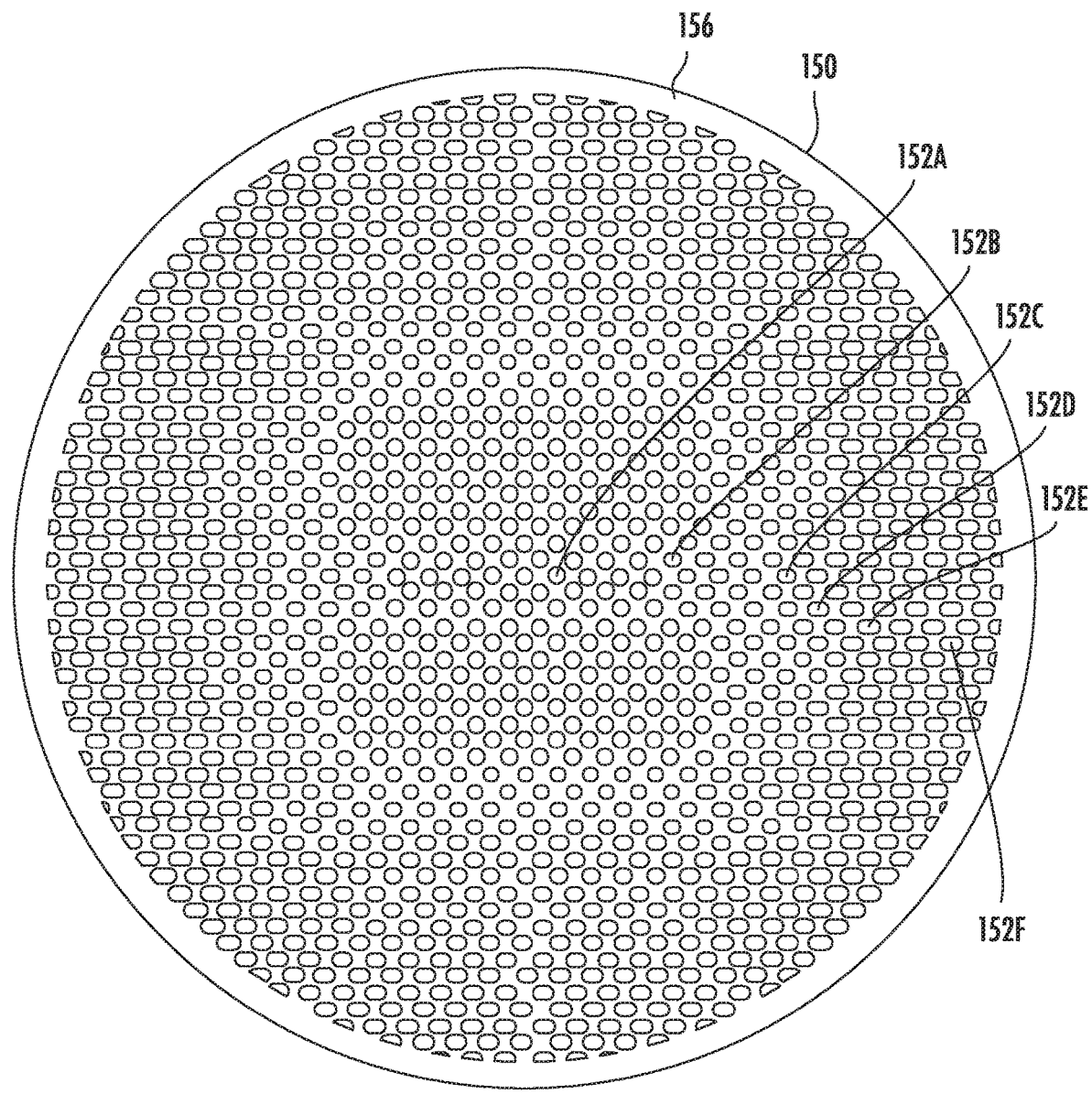
FIG. 3A is a front elevational view of a second plate defining a second plurality of openings therethrough, including openings arranged at different radial positions that differ in area, ranging from round in shape proximate to a center of the second plate to slotted shapes with rounded ends (i.e., geometric stadium shapes) increasing in width toward a periphery of the second plate.

FIG. 3A is a front elevational view of the second plate 150, which is round in shape and includes a second plurality of openings defined therethrough, with the second plurality of openings including openings 152A-152F, which collectively may be referred to hereinafter as openings 152. The second plurality of openings 152 includes openings 152A-152F arranged at different radial positions that differ in area. As shown, openings 152A proximate to a center of the second plate are round in shape, with openings 152B-152F embodying slotted shapes (with rounded ends) that increase in width with increasing proximity to a peripheral region 156 of the second plate 150, and with the openings 152B-152F having maximum widths extending parallel to one another. In certain embodiments, each opening 152B-152F may be considered to embody a geometric "stadium" shape, formable as a rectangle with a pair of semi-circles positioned at opposing ends. The peripheral region 156 of the second plate 150 is devoid of openings of the second plurality of openings 152.

Figure 3B:
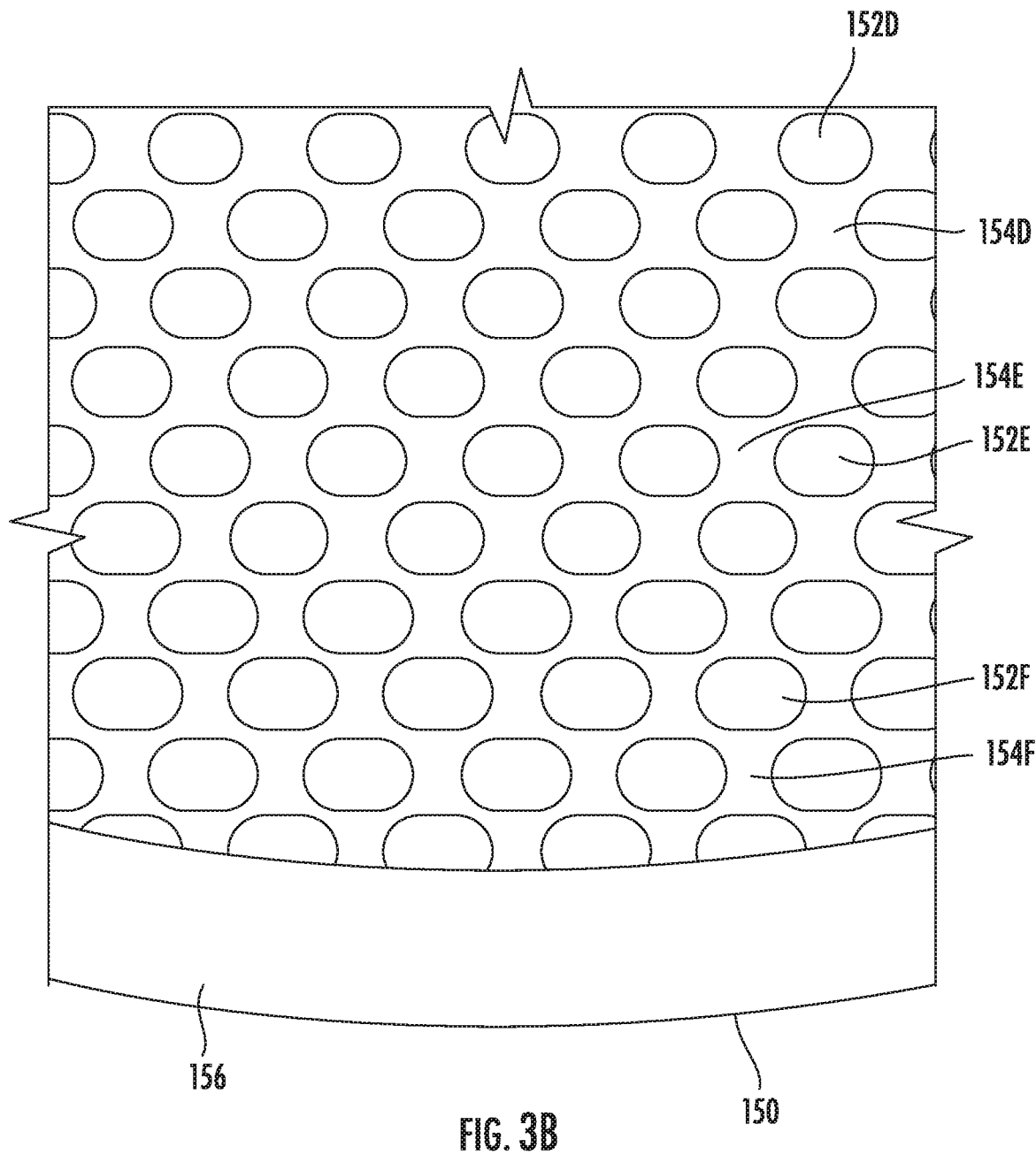
FIG. 3B is a front elevational view of a first magnified portion of the second plate of FIG. 3A.

FIG. 3B is a front elevational view of a first magnified portion (e.g., a lower central portion) of the second plate 150 of FIG. 3A. FIG. 3B shows openings 152D-152F arranged in zones 154D-154F of the second plate 150, and the peripheral region 156 of the second plate 150 being devoid of openings. As shown, openings 152F are wider than openings 152E, and openings 152E are wider than openings 152D, with all openings 152D-152F having maximum widths extending parallel to one another.

Figure 3C:
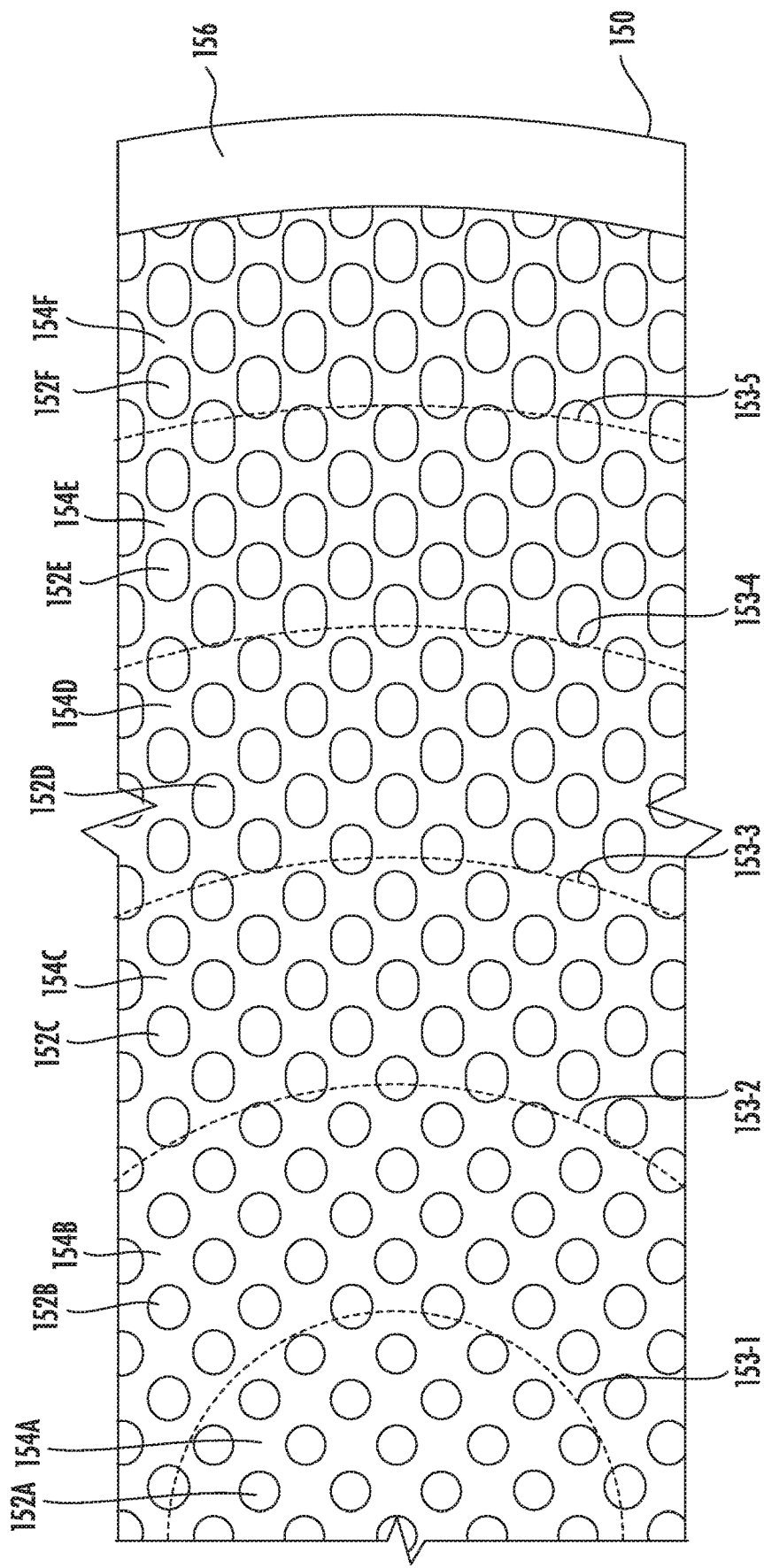
FIG. 3C is a front elevational view of a second magnified portion of the second plate of FIG. 3A, with superimposed arcs in dashed lines identifying boundaries between concentric first through sixth zones of the second plate.

FIG. 3C is a front elevational view of a second magnified portion of the second plate 150 of FIG. 3A, with superimposed arcs 153-1 to 153-5 (illustrated in dashed lines) identifying boundaries between concentric first through sixth zones 154A-154F. As shown, openings 152A-152F are provided in the first through sixth zones 154A-154F, respectively, wherein openings 152A-152F arranged in each successive zone of the first through sixth zones 154A-154F have widths that increase from zone to zone. Restated, widths of the openings 152A-152F may be substantially constant in each zone 154A-154F, but opening widths may change from zone to zone among the first through sixth zones 154A-154F. As shown, the first zone 154A is round in shape, while the second through sixth zones 154B-154F are annular in shape, with the sixth zone 154F being bounded by the annularly-shaped peripheral region 156 of the second plate.

Although FIG. 3C illustrates six zones 154A-154F of the second plate 150 with openings of different sizes arranged in successive zones, it is to be appreciated that any suitable number of two or more zones (e.g., two, three, four, five, six, seven, eight, nine, ten or more zones) may be provided in certain embodiments.

If at least three zones are provided, then such zones may be referred to as central, intermediate, and peripheral zones. In certain embodiments, multiple intermediate zones may be provided between central and peripheral zones. In certain embodiments, the first and second plates 140, 150 are both round in shape, such that a central zone is round in shape, and any successive intermediate and/or peripheral zones may be annular in shape. In certain embodiments, all zones defined in a plate are concentric.

In certain embodiments, each of a first plate and a second plate may extend across substantially an entire width of a single flow path of the extrudate source material upstream of an extrusion die. In such an embodiment, a first plate and a second plate are arranged in series. In certain embodiments, a first plate and a second plate may be in direct contact with one another; in other embodiments, one or more shims, standoffs, or other spacing members may be provided between at least portions of first and second plates as disclosed herein.

Figure 4A:
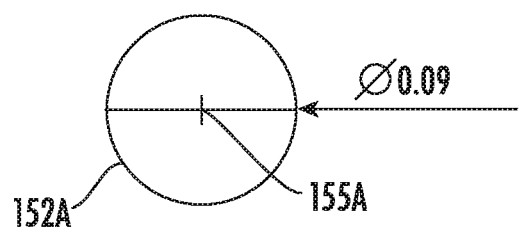
FIGS. 4A-4F illustrate shapes and dimensions for the openings provided in the first through sixth zones, respectively, of the second plate of FIGS. 3A-3C.
Figure 4B:
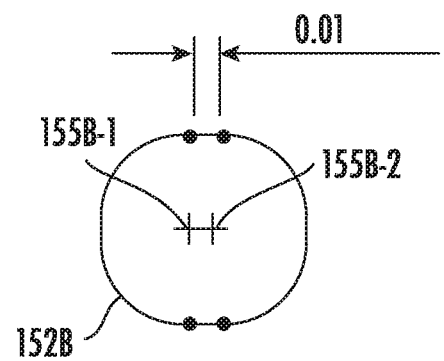
Figure 4C:
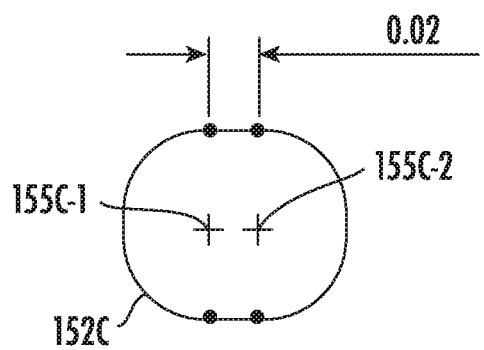
Figure 4D:
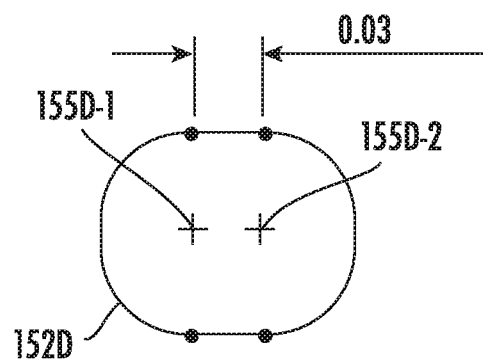
Figure 4E:
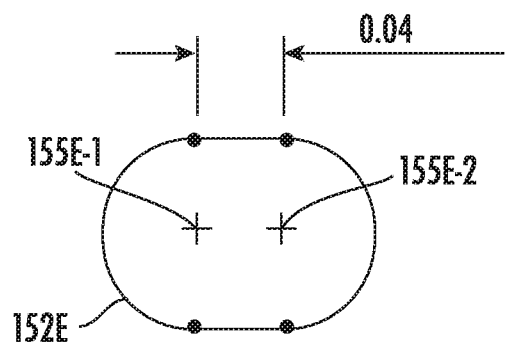
Figure 4F:
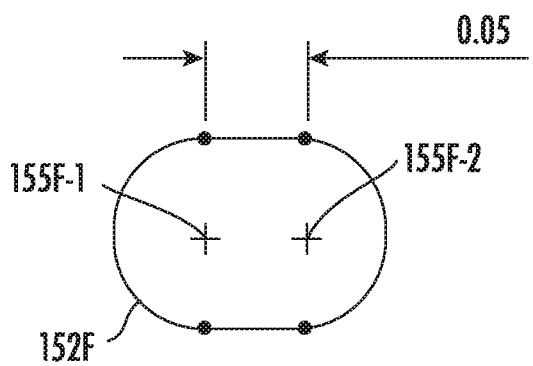

FIGS. 4A-4F illustrate shapes and exemplary dimensions for the openings 152A-152F defined in the second plate 150 of FIGS. 3A-3C. The dimensional values are provided by way of example only, and are not intended to limit the scope of the disclosure, since one skilled in the art would appreciate that openings of any suitable sizes and/or shapes may be provided in certain embodiments. FIG. 4A illustrates an opening 152A that is round in shape, with a single center point 155A, and a diameter of 0.09 inch (2.29 mm). FIG. 4B illustrates an opening 152B embodying a stadium shape, formable as a medial rectangle 0.01 inch (0.254 mm) wide bounded at opposing ends by two semicircles each having an arc center 155B-1, 155B-2 and a diameter of 0.09 inch (2.29 mm). FIG. 4C illustrates an opening 152C embodying a stadium shape, formable as a medial rectangle having a width of 0.02 inch (0.51 mm) bounded at opposing ends by two semicircles each having an arc center 155C-1, 155C-2 and a diameter of 0.09 inch (2.29 mm). FIG. 4D illustrates an opening 152D embodying a stadium shape, formable as a medial rectangle having a width of 0.03 inch (0.762 mm) bounded at opposing ends by two semicircles each having an arc center 155D-1, 155D-2 and a diameter of 0.09 inch (2.29 mm). FIG. 4E illustrates an opening 152E embodying a stadium shape, formable as a medial rectangle having a width of 0.04 inch (1.016 mm) bounded at opposing ends by two semicircles each having an arc center 155E-1, 155E-2 and a diameter of 0.09 inch (2.29 mm). FIG. 4F illustrates an opening 152F embodying a stadium shape, formable as a medial rectangle having a width of 0.05 inch (1.27 mm) wide bounded at opposing ends by two semicircles each having an arc center 155F-1, 155F-2 and a diameter of 0.09 inch (2.29 mm).

Figure 5A:
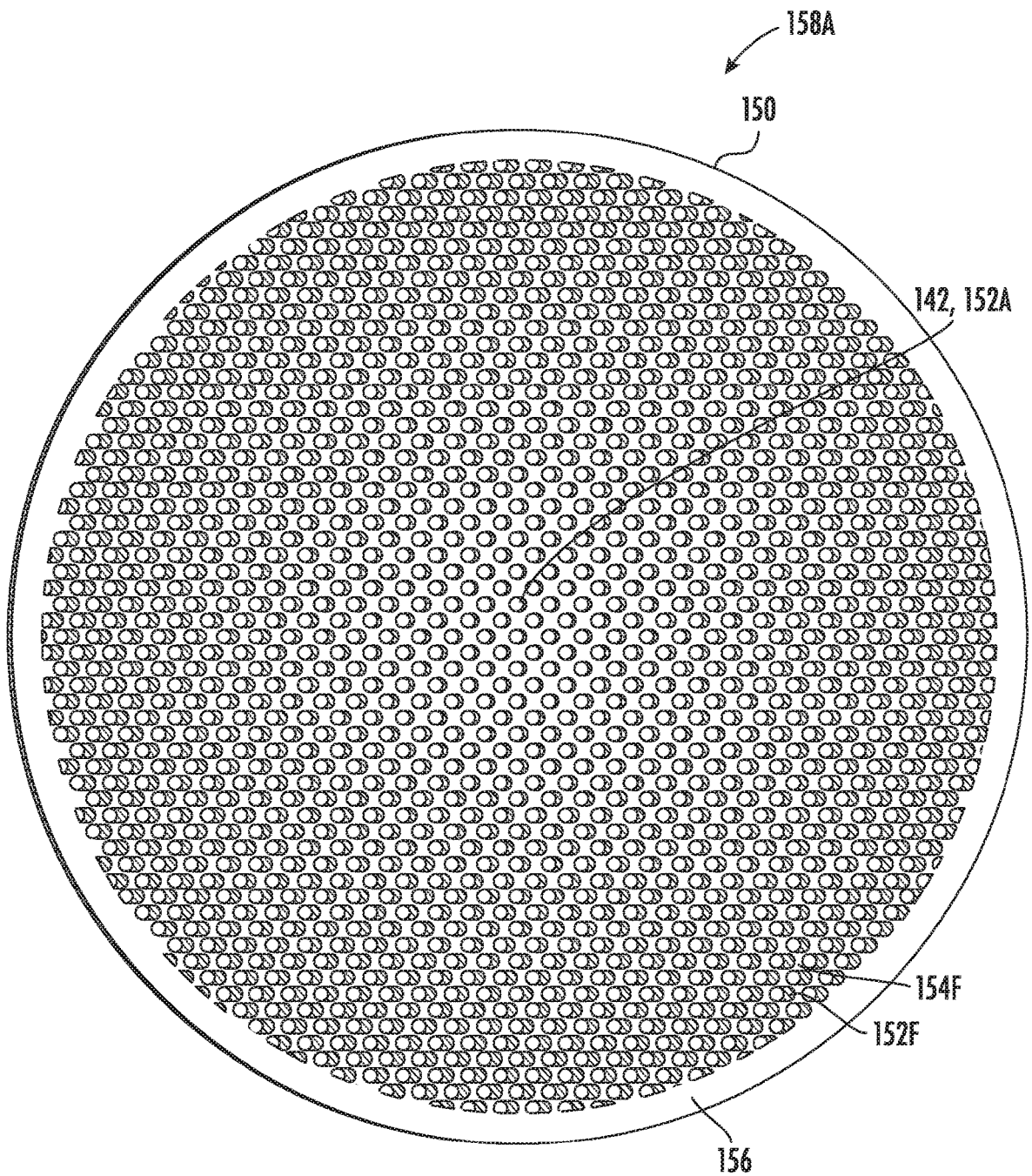
FIG. 5A is a front elevational view of the first and second plates of FIGS. 2 and 3A in a first overlap configuration in which a flow area of all openings in the first plate is unrestricted by the overlying second plate.

FIG. 5A is a front elevational view of the first and second plates 140, 150 of FIGS. 2 and 3A with the second plate 150 overlying the first plate, in a first overlap configuration 158A in which a flow area of each opening of the first plurality of openings 142 is substantially unrestricted by the second plate 150. At a center of the second plate 150, openings 152A, 142 of the second and first plates, respectively, are substantially the same size and shape, and are registered with one another. At a sixth zone 154F of the second plate 150 (e.g., proximal to the peripheral region 156), openings 152F defined in the second plate 150 are substantially wider than corresponding openings defined in the first plate 140.

Figure 5B:
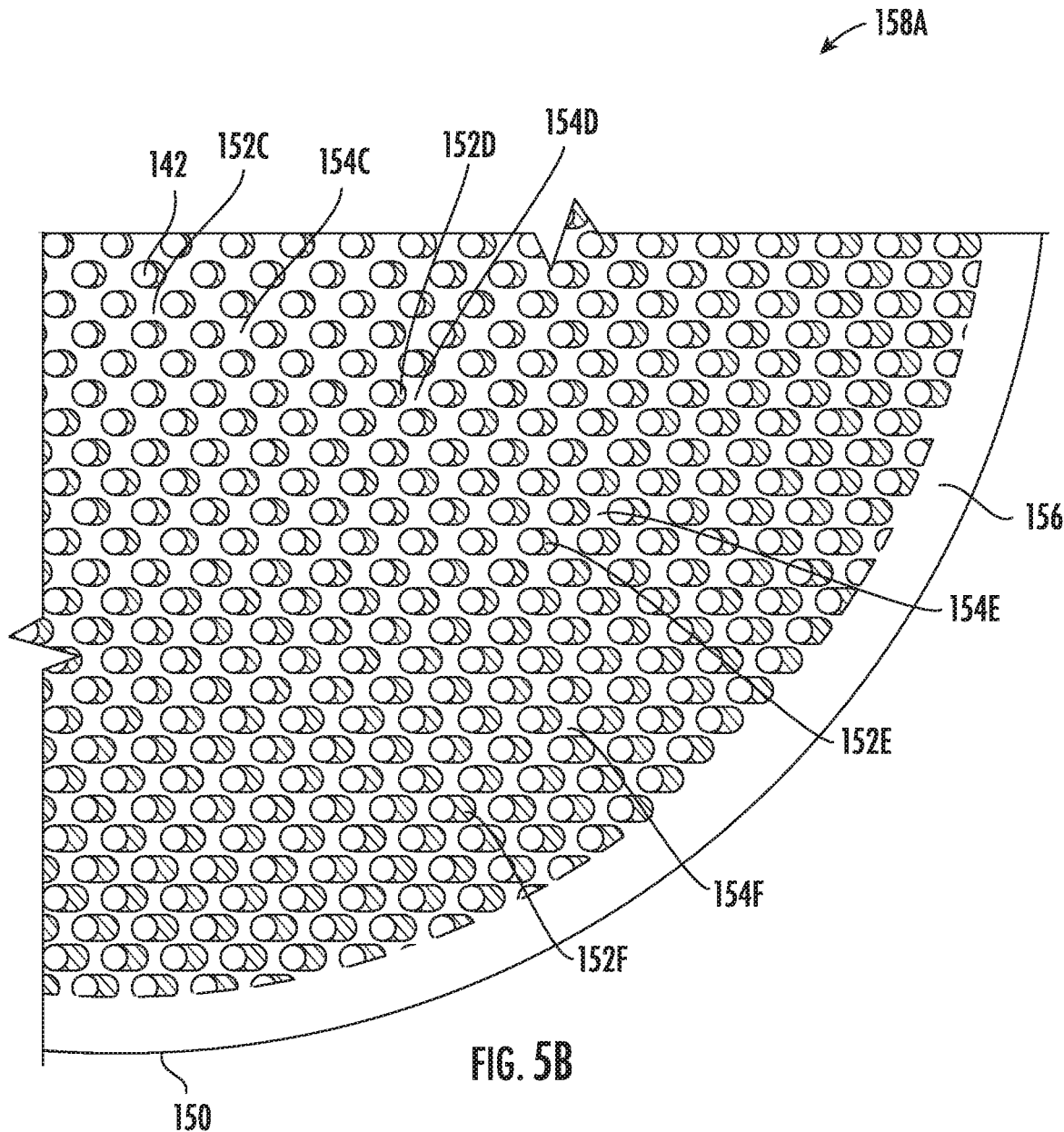
FIG. 5B is a front elevational view of a portion of the overlapping first and second plates of FIG. 5A.

FIG. 5B is a front elevational view of a portion of the overlapping first and second 140, 150 plates of FIG. 5A, showing the second plate 150 in the foreground. Fourth through sixth zones 154D-154F of the second plate 150 are shown, defining openings 152D-152F, respectively, wherein openings 152F in the sixth zone 154F are wider than openings 152E in the fifth zone 154E, and openings 152E in the fifth zone 154E are wider than openings 152D in the fourth zone 154D. As shown, openings 142 defined in the first plate are unrestricted by the overlying openings 152 (including, but not limited to, openings 152D-152F) in the second plate 150.

Figure 6A:
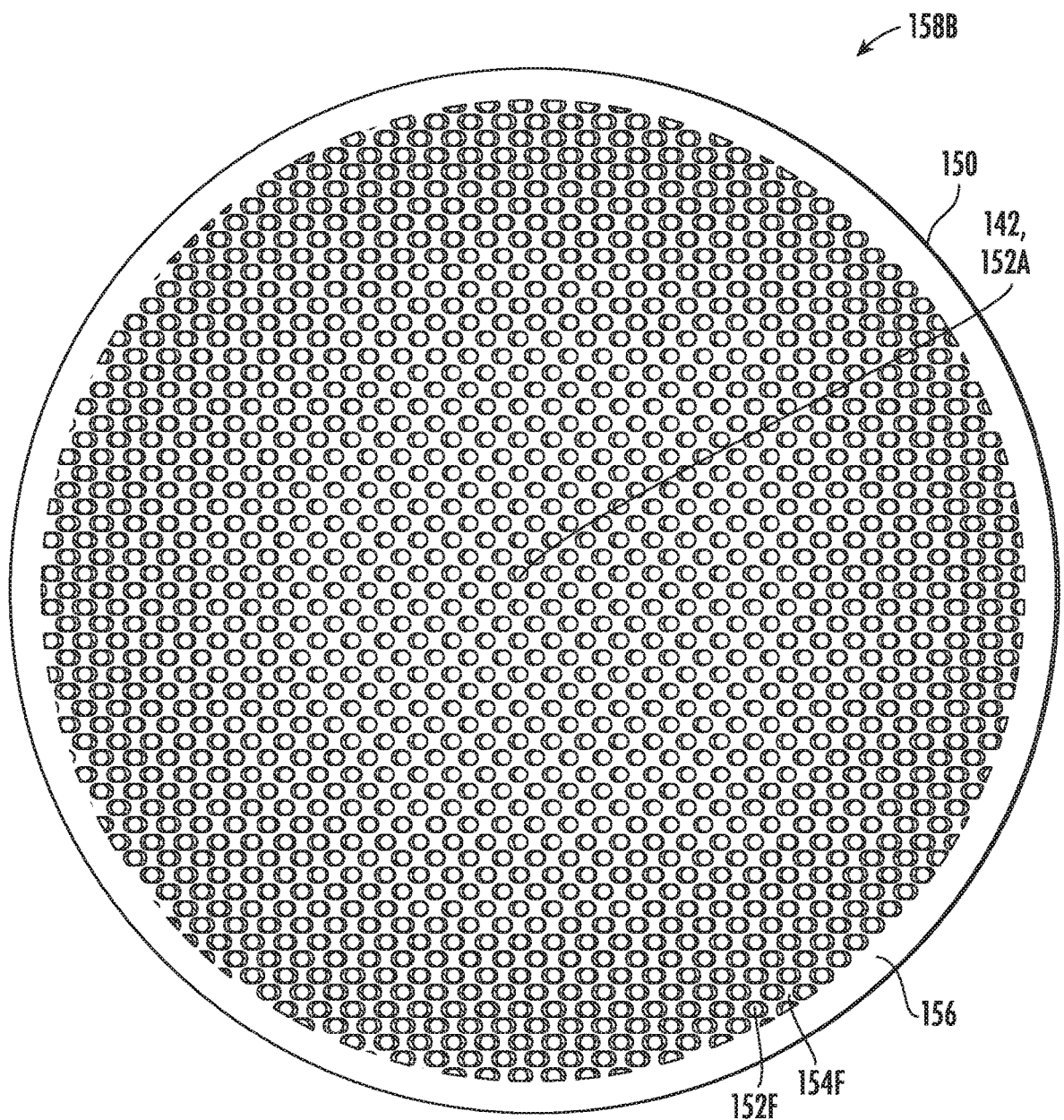
FIG. 6A is a front elevational view of the first and second plates of FIGS. 2 and 3A in a second overlap configuration exhibiting a first gradient of flow area restriction from a center to a periphery of the plates, providing a relatively low degree of restriction in a central region of the first plate by the overlying second plate, and no restriction in intermediate and peripheral regions of the plates.

FIG. 6A is a front elevational view of the first and second plates 140, 150 of FIGS. 2 and 3A with the second plate 150 overlying the first plate, in a second overlap configuration 158B exhibiting a first gradient of flow area restriction from a center to a periphery of the first and second plates 140, 150. The illustrated overlap configuration 158B provides a relatively low degree of restriction in a central region of the first and second plates 140, 150, but no restriction of the flow area in intermediate and peripheral regions of the first plate 140. At a center of the second plate 150, openings 152A, 142 of the second and first plates 150, 140, respectively, are substantially the same size and shape, and are partially but not fully registered with one another. At a sixth zone 154F of the second plate 150 (e.g., proximal to the peripheral region 156), openings 152F defined in the second plate 150 are substantially wider than corresponding openings 142 defined in the first plate 140, but openings in the first plate 140 are fully unrestricted.

Figure 6B:
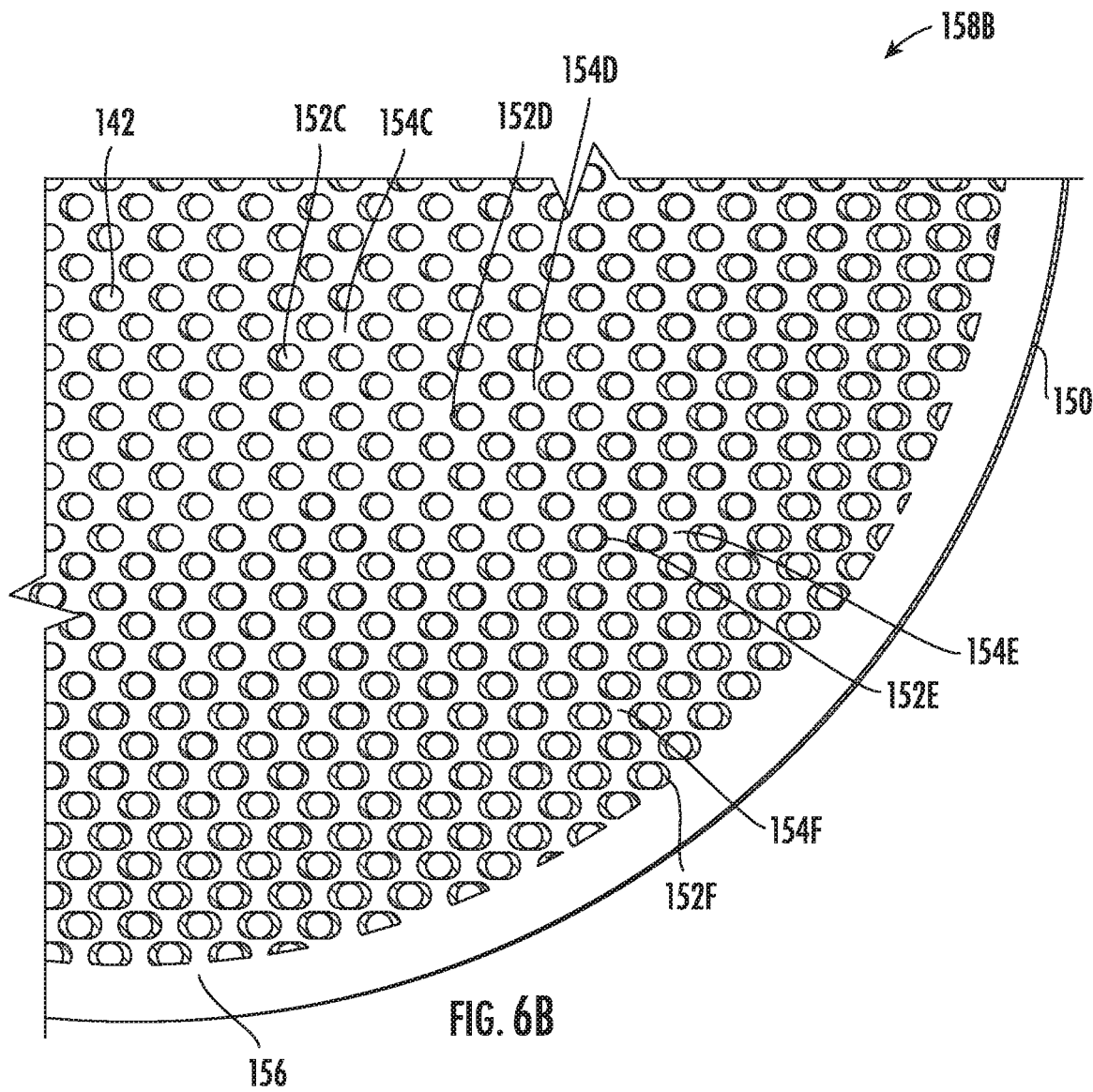
FIG. 6B is a front elevational view of a portion of the overlapping first and second plates of FIG. 6A.

FIG. 6B is a front elevational view of a portion of the overlapping first and second plates 140, 150 of FIG. 6A, showing the second plate 150 in the foreground. Third through sixth zones 154C-154F of the second plate 150 are shown, defining openings 152C-152F, respectively, wherein openings 152F in the sixth zone 154F are wider than openings 152C-152E in the third through fifth zones 154C-154E, respectively. As shown, openings 142 defined in the first plate 140 are unrestricted by the overlying openings 152C-152F in the third through sixth zones 154C-154F of the second plate 150.

Figure 7A:
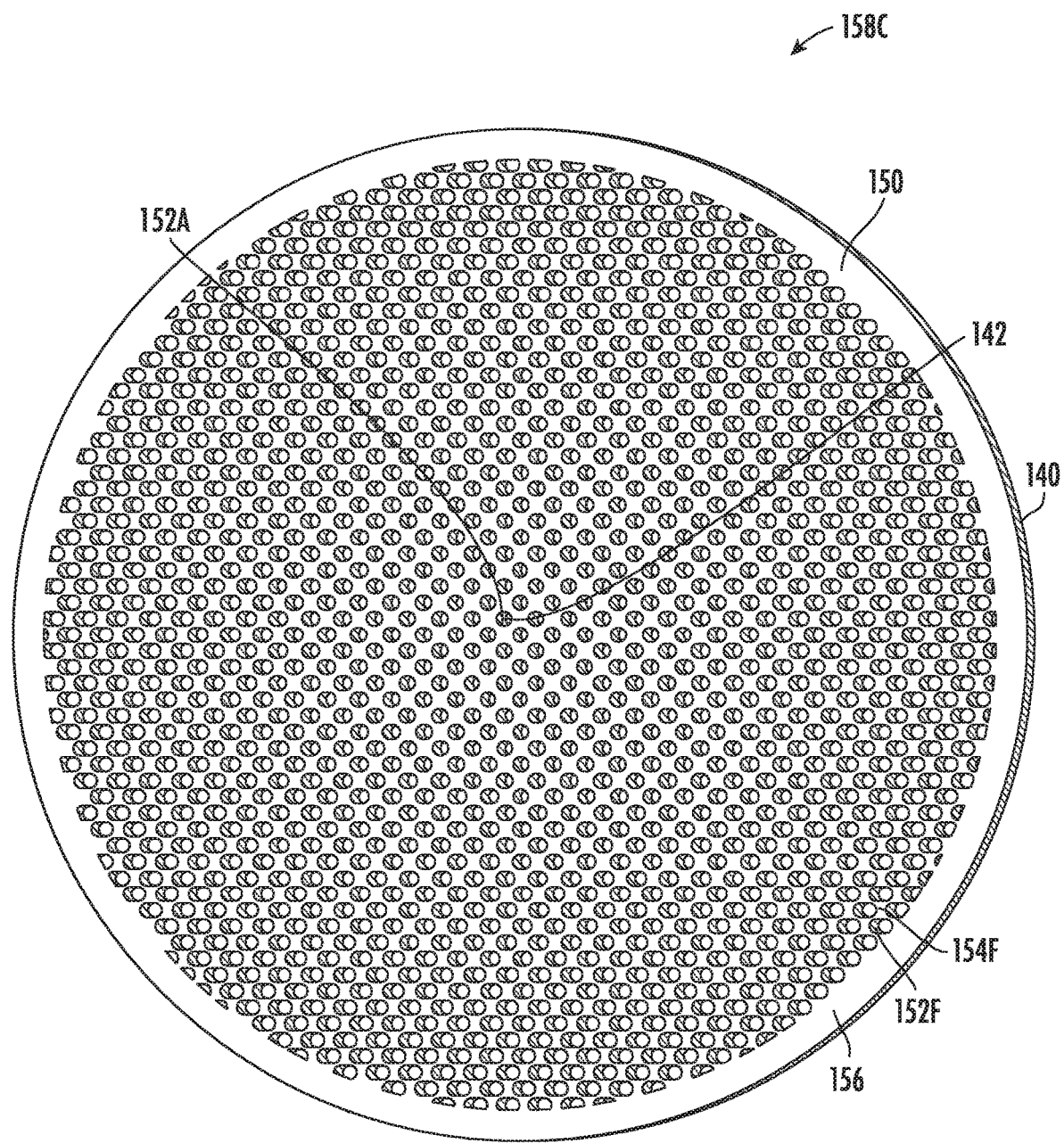
FIG. 7A is a front elevational view of the first and second plates of FIGS. 2 and 3A in a third overlap configuration exhibiting a second gradient of flow area restriction from a center of the first plate to a periphery of the plates, providing a moderate degree of restriction in a central region of the first plate by the overlying second plate, a relatively low degree of restriction in an intermediate region of the plates, and no restriction in a peripheral region of the plates.

FIG. 7A is a front elevational view of the first and second plates 140, 150 of FIGS. 2 and 3A with the second plate 150 overlying the first plate 140, in a third overlap configuration 158C exhibiting a second gradient of flow area restriction from a center to a periphery of the first and second plates 140, 150. This overlap configuration 158C provides a moderate degree of restriction in a central region of the first and second plates 140, 150, a relatively low degree of restriction in an intermediate region of the first and second plates 140, 150, and no restriction in a peripheral region of the first and second plates 140, 150. At a center of the second plate 150, openings 152A, 142 of the second and first plates 150, 140, respectively, are substantially the same size and shape, but only partially overlapping. At a sixth zone 154F of the second plate 150 (e.g., proximal to the peripheral region 156), openings 152F defined in the second plate 150 are substantially wider than corresponding openings 142 defined in the first plate 140, but openings 142 in the first plate 140 are fully unobscured. Between the central and peripheral zones of the second plate 150, some openings 142 in the first plate 140 are partially obscured.

Figure 7B:
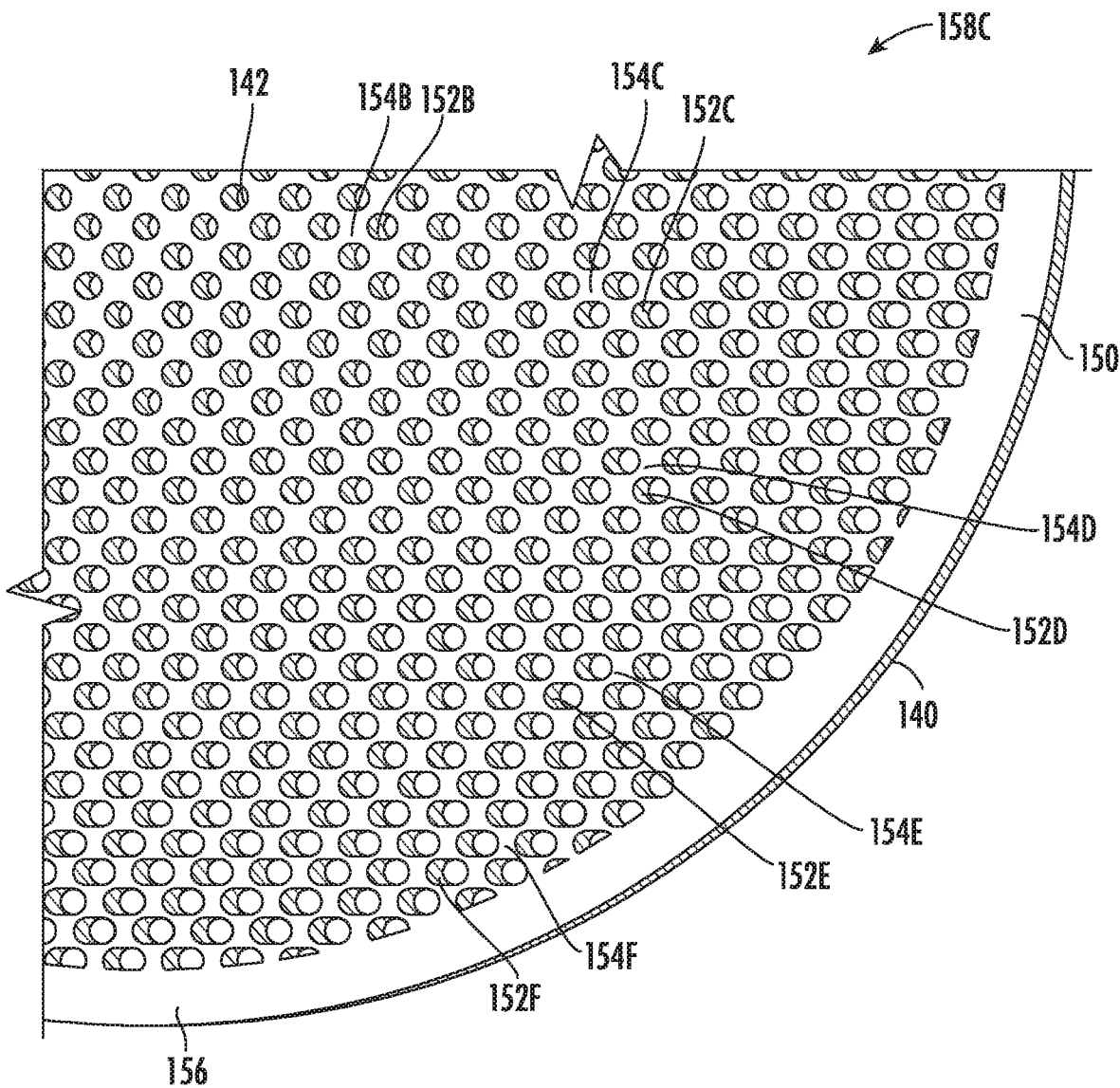
FIG. 7B is a front elevational view of a portion of the overlapping first and second plates of FIG. 7A.

FIG. 7B is a front elevational view of a portion of the overlapping first and second plates 140, 150 of FIG. 7A, showing the second plate 150 in the foreground. Second through sixth zones 154B-154F of the second plate 150 are shown, defining openings 152B-152F, respectively, wherein openings 152F in the sixth zone 154F are wider than openings 152B-152E in the second through fifth zones 154B-154E, respectively. As shown, openings 142 defined in the first plate 140 are partially restricted (to varying degrees) by lack of registration of overlying openings 152B-152E in the second through fifth zones 154C-154E of the second plate 150, while openings 152F in the sixth zone 154F are unrestricted.

Figure 8A:
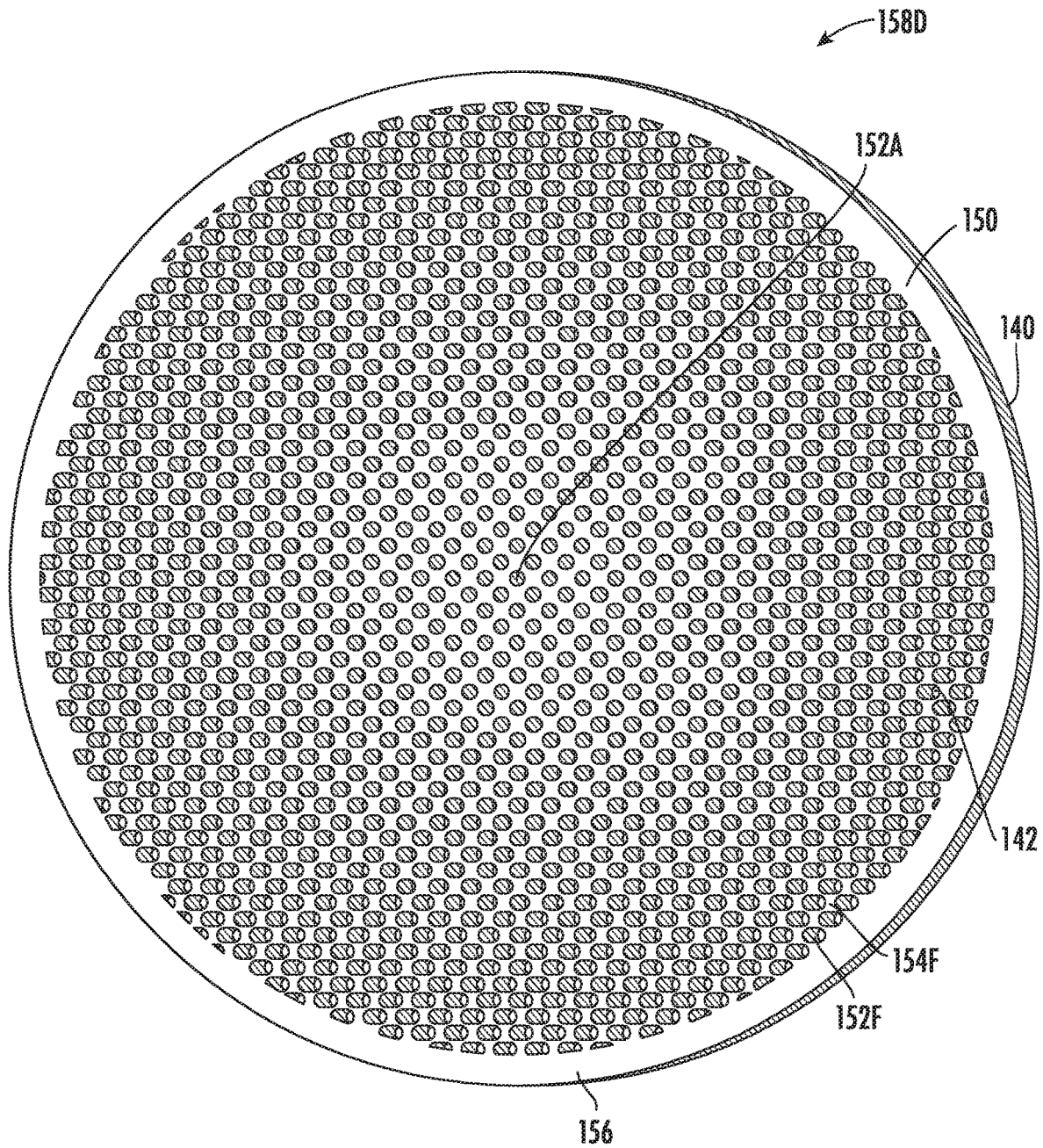
FIG. 8A is a front elevational view of the first and second plates of FIGS. 2 and 3A in a fourth overlap configuration exhibiting a third gradient of flow area restriction from a center of the first plate to a periphery of the plates, providing complete restriction in a central region of the first plate by the overlying second plate, and at least a moderate degree of restriction in other (e.g., intermediate and peripheral) regions of the plates.

FIG. 8A is a front elevational view of the first and second plates 140, 150 of FIGS. 2 and 3A with the second plate 150 overlying the first plate, in a fourth overlap configuration 158D exhibiting a third gradient of flow area restriction from a center to a periphery of the plates. This overlap configuration 158D provides complete restriction in a central region of the plates 140, 150, and at least a moderate degree of restriction in other (e.g., intermediate and peripheral) regions of the plates 140, 150. At a center of the second plate 150, openings 152A in the second plate 150 are fully obscured due to lack of overlap with any openings 142 defined in the first plate 140. At a peripheral zone 154F of the second plate 150 (e.g., proximal to the peripheral region 156), openings 152F defined in the second plate 150 are substantially wider than corresponding openings 142 defined in the first plate 140, but openings 142 in the first plate 140 are partially obscured. Between central and peripheral zones of the second plate 150, some openings in the first plate 140 are partially obscured, and other openings are fully obscured.

Figure 8B:
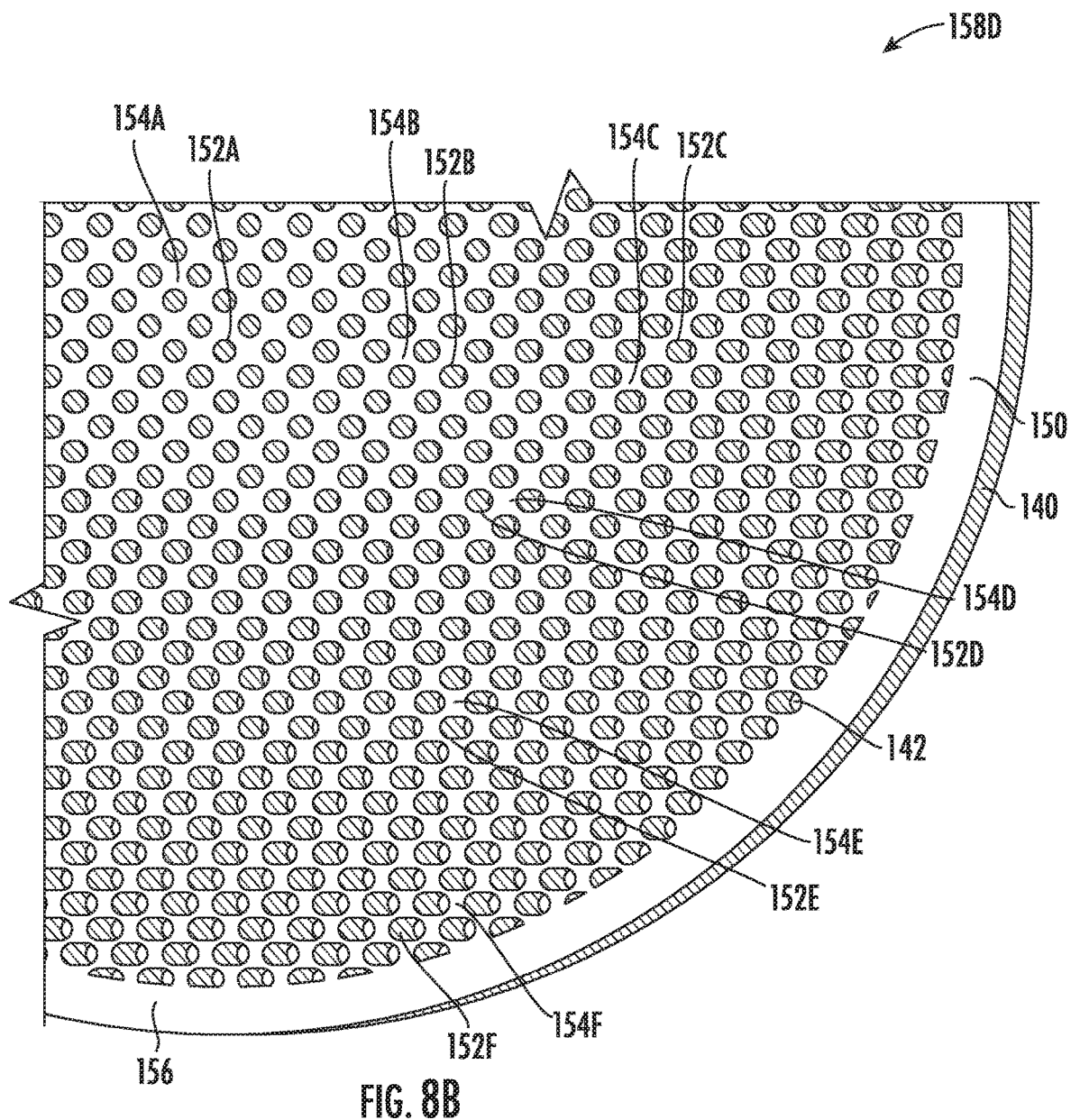
FIG. 8B is a front elevational view of a portion of the overlapping first and second plates of FIG. 8A.

FIG. 8B is a front elevational view of a portion of the overlapping first and second plates 140, 150 of FIG. 8A, showing the second plate 150 in the foreground. First through sixth zones 154A-154F of the second plate 150 are shown, defining openings 152A-152F, respectively, wherein openings 152F in the sixth zone 154F are wider than openings 152A-152E in the first through fifth zones 154A-154E, respectively. As shown, numerous openings defined in the first plate 140 are fully obscured by lack of registration of overlying openings 152A-152B in the first and second zones 154A, 154B of the second plate, while other openings 152C-152F in the third through sixth zones 154C-154F of the second plate 150 are restricted to varying degrees by lack of complete registration with openings 142 in the first plate 140.

As shown in FIGS. 5A-8B, a change in relative (e.g., translational) position between the first and second plates 140, 150 may be used to adjust open flow area through overlapping openings in the first and second plates 140, 150, and therefore adjust distribution of flow of extrudate source material through the first and second plates 140, 150, in a center-to-outer manner. In particular, by providing openings in the second plate 150 that have a greater width proximate to a peripheral region 156 of the second plate 150, significant flow of extrudate source material can be maintained through peripheral regions of the first and second plates 140, 150 even when flow of extrudate source material is restricted (or even blocked) through central regions of the first and second plates 140, 150.

Although FIGS. 3A to 8B show openings of various widths extending in the same direction, such that flow through first and second plates may be adjusted by altering relative lateral position between such plates, in certain embodiments, flow through first and second plates may be adjusted by altering rotational position between such plates. In certain embodiments, openings having arc-like shapes (with increasing arc lengths with increasing distance from a center to a peripheral edge of a plate) may be provided in at least one plate.

In certain embodiments, relative movement (e.g., lateral translation or rotation) between first and second plates may be effectuated with an adjustment mechanism. Examples of adjustment mechanisms permitting linear translation include threaded bolts or rods, bosses, pistons, solenoids, and the like. Examples of adjustment mechanisms permitting rotational movement include motors, solenoids, four-bar mechanisms, and the like. Optionally, a frame supporting the first and/or second plates may be provided, with the adjustment mechanism being supported by and/or integrated with such a frame. In certain embodiments, relative position between first and second plates may be adjusted by one or more manual inputs. In certain embodiments, relative position between first and second plates may be adjusted automatically, such as with a controller (or control system) using feedback from one or more sensors configured to detect one or more conditions indicative of defects (or lack of defects) in a honeycomb extrudate or honeycomb extrudate segment.

Figure 9:
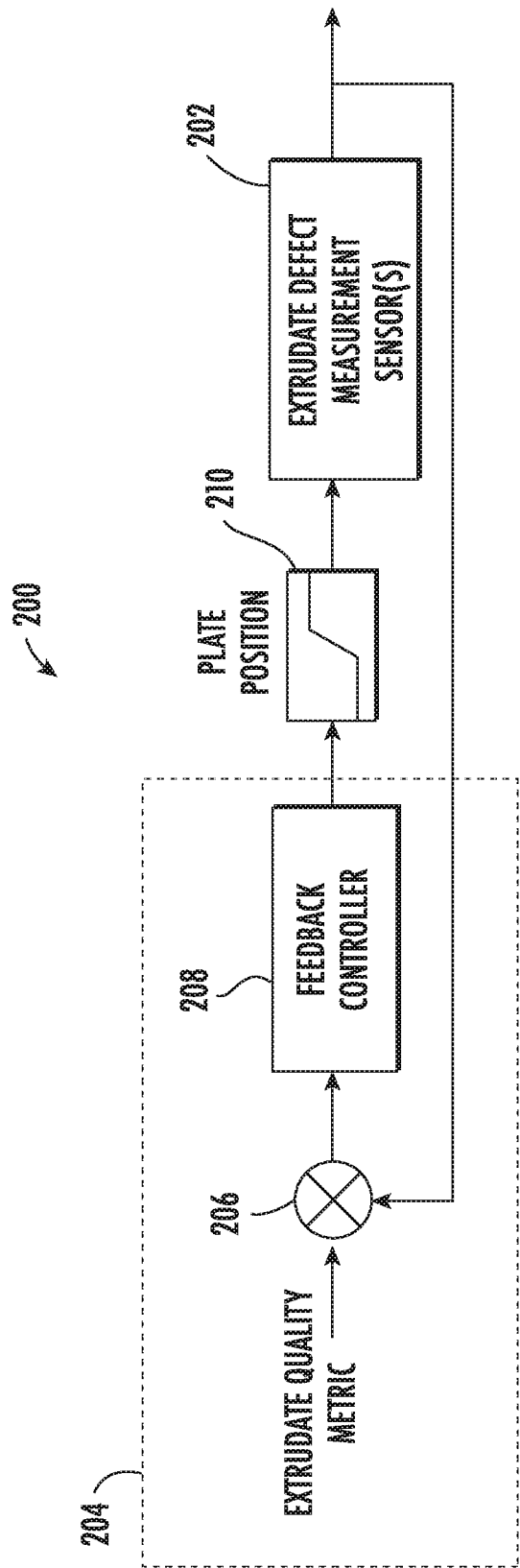
FIG. 9 is a schematic diagram of an extrudate control system to control operation of an extrusion system according to exemplary embodiments of the disclosure.

FIG. 9 is a schematic diagram of an extrudate control system 200 configured to control operation of an extrusion system according to exemplary embodiments of the disclosure. In the extrudate control system 200, a control unit 204 serves to compare an extrudate quality metric standard to an extrudate monitoring measurement obtained by one or more extrudate defect measurement sensors 202 at operation 206. The extrudate quality metric standard may comprise a stored measurement of a defect-free extrudate. The extrudate defect measurement sensors 202 can measure, in situ, one or more extrudate quality metrics such as skin quality, shape quality, intersecting wall quality, etc. during extrusion, and provide a measurement signal for use in the comparison performed at operation 206. In certain embodiments, the extrudate defect measurements sensors 202 may include axial sensors configured to image end faces of a honeycomb extrudate or extrudate segment, and/or peripheral sensors configured to image the skin or external surface of a honeycomb extrudate or extrudate segment. For example, an axial sensor may include one more light sources (e.g., LEDs, lasers, etc.) in conjunction with one or more axial optical sensors (such a charge-coupled device (CCD), camera, or the like) to image an end face of a honeycomb extrudate or extrudate segment, and a peripheral sensor may include one or more light sources configured to image a skin or external surface of a honeycomb extrudate or extrudate segment. In certain embodiments, sensors of various types other than, or in addition to, optical sensors may be used. One or more measurement signals obtained or derived from the extrudate monitoring measurement sensors 202 can be transmitted and used by the control unit 204 in the comparison at operation 206. Within the control unit 204, a feedback controller 208 may either maintain settings used by extrusion hardware or adjust settings used by extrusion hardware as a result of a comparison signal generated at operation 206. Adjustment of extrusion hardware settings may change one or more extrusion process parameters. In certain embodiments, extrusion hardware subject to being adjusted may include a plate positioning mechanism 210 that may be used to move the first plate 140 or second plate 150 as described previously herein, to adjust a center-to-outer distribution of extrudate source material through an extrusion apparatus. In certain embodiments, a plate positioning mechanism 210 may include a piston, a solenoid, a motor, or the like. In certain embodiments, extrusion hardware subject to being adjusted may include a bow corrector apparatus 110 and/or an infinitely variable externally controllable flow plate 122, such as illustrated and described in connection with FIG. 1.

FIGS. 10A-10D provide three-dimensional plots of hole/slot open area versus X location and Y location for the overlapping first and second plates 140, 150 of FIGS. 2 and 3A when in the overlap configurations showing in FIGS. 5A, 6A, 7A, and 8A, respectively. In context of "hole/slot open area" show in the legends for FIGS. 10A-10D, "holes" refer to openings 142 defined in the first plate 140, and "slots" refer to openings 152A-152F defined in the second plate 150.

Figure 10A:
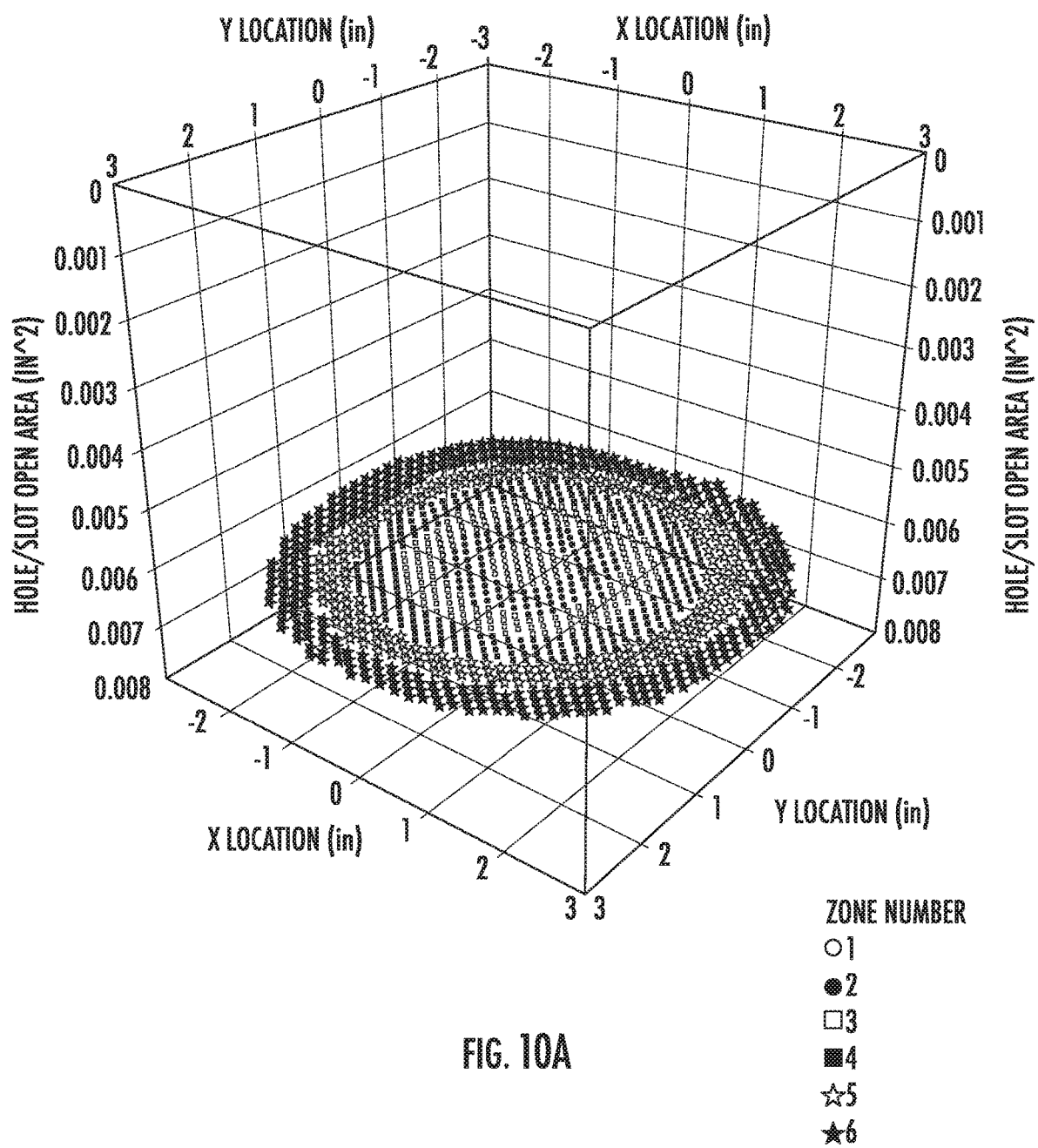
FIG. 10A is a three-dimensional plot of hole/slot open area versus X location and Y location for the overlapping first and second plates of FIGS. 2 and 3A, with data points for first through sixth zones of the second plate, when the plates are in the first overlap configuration shown in FIGS. 5A and 5B.

FIG. 10A is a three-dimensional plot of hole/slot open area versus X location and Y location for the overlapping first and second plates 140, 150 of FIGS. 2 and 3A, with data points for first through sixth zones of the second plate 150 when the first and second plates 140, 150 are in the first overlap configuration 158A as shown in FIGS. 5A and 5B. As shown in FIG. 10A, hole/slot open area in each of the first through sixth zones is substantially equal.

Figure 10B:
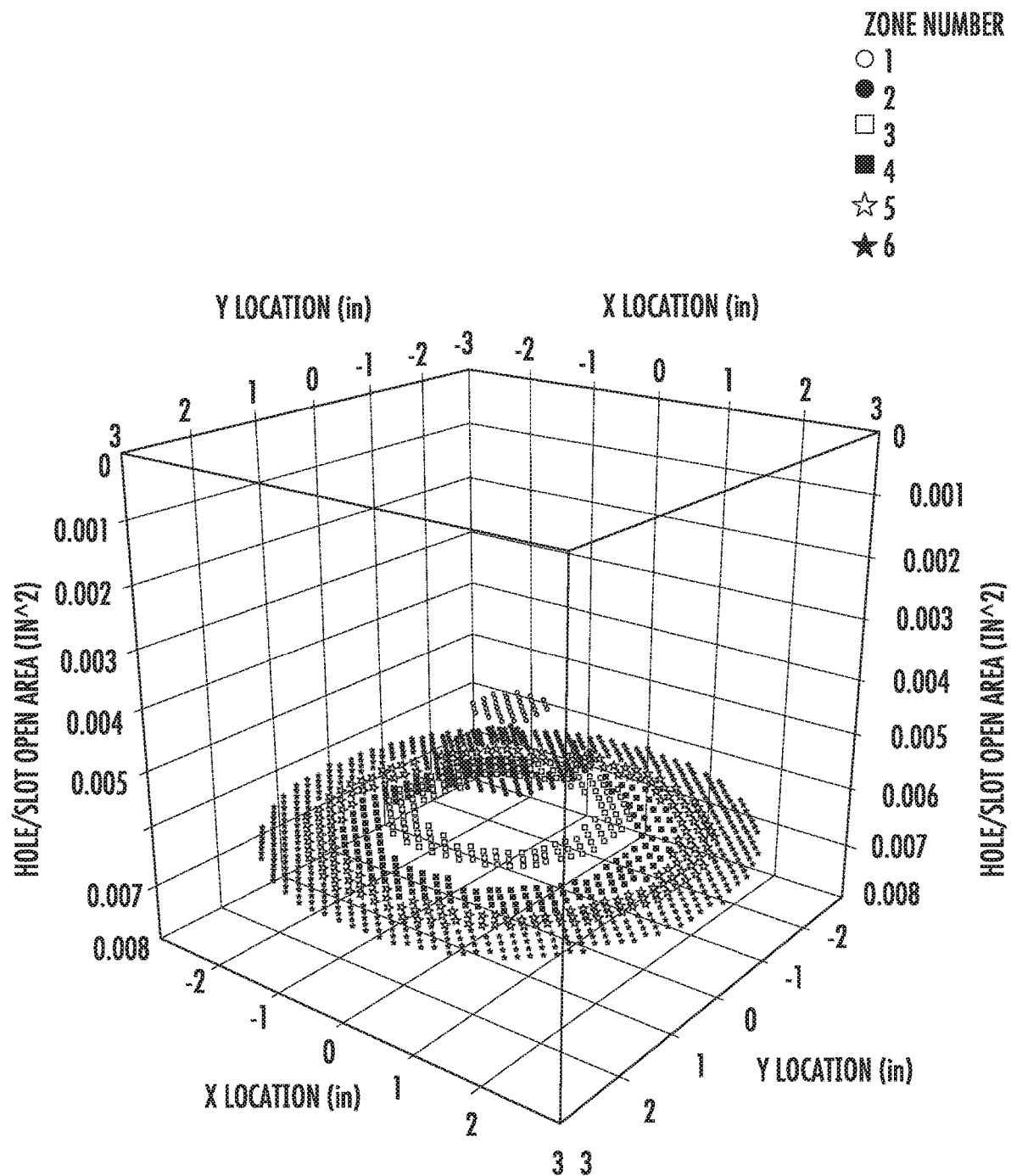
FIG. 10B is a three-dimensional plot of hole/slot open area versus X location and Y location for the overlapping first and second plates of FIGS. 2 and 3A, with data points for first through sixth zones of the second plate, when the plates are in the second overlap configuration shown in FIGS. 6A and 6B.

FIG. 10B is a three-dimensional plot of hole/slot open area versus X location and Y location for the overlapping first and second plates 140, 150 of FIGS. 2 and 3A, with data points for first through sixth zones of the second plate 150 when the first and second plates 140, 150 are in the second overlap configuration 158B as shown in FIGS. 6A and 6B. As shown in FIG. 10B, hole/slot open area is reduced in the first through third zones, while the hole/slot open area is substantially the same in the fourth through sixth zones.

Figure 10C:
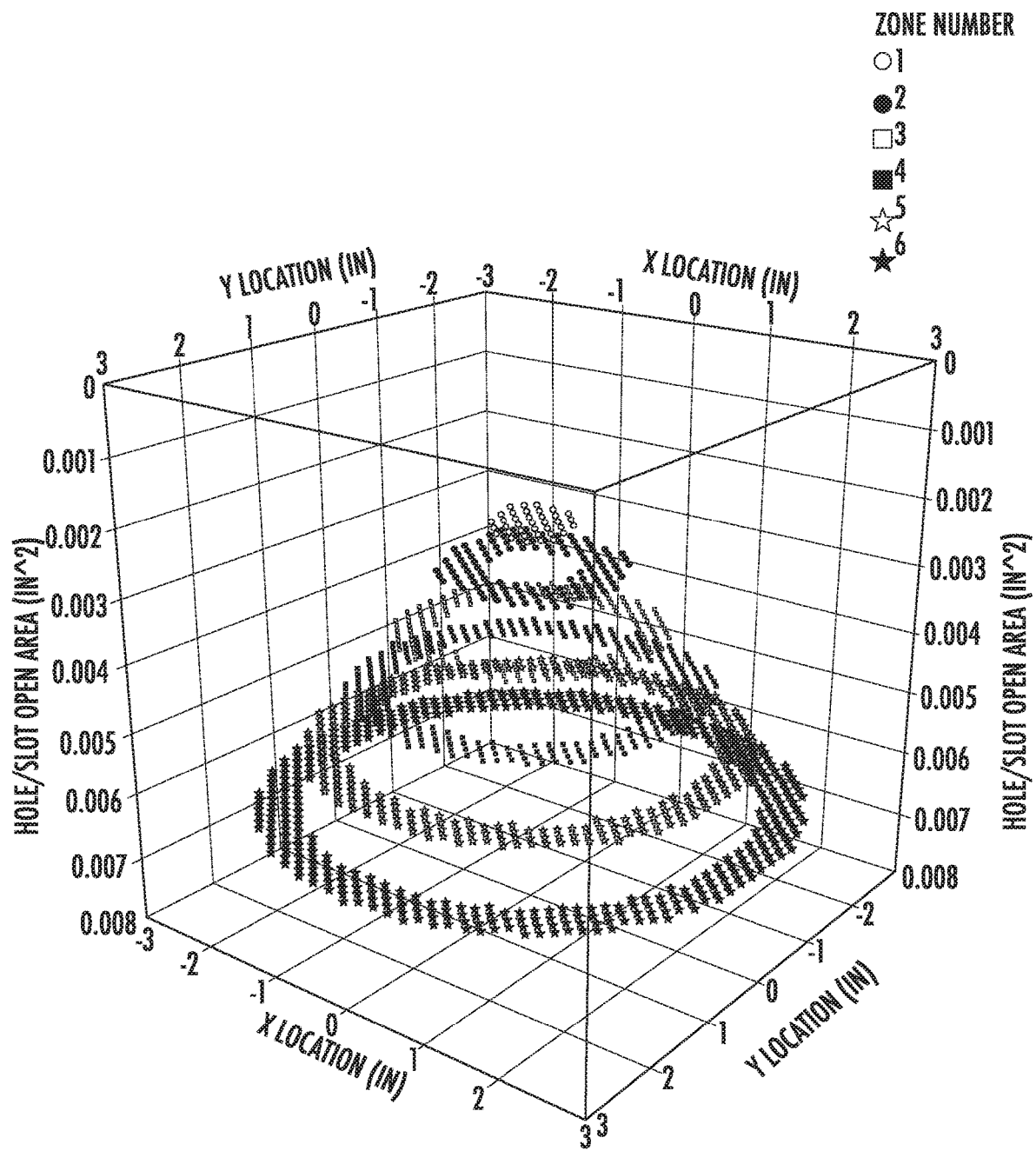
FIG. 10C is a three-dimensional plot of hole/slot open area versus X location and Y location for the overlapping first and second plates of FIGS. 2 and 3A, with data points for first through sixth zones of the second plate, when the plates are in the third overlap configuration shown in FIGS. 7A and 7B.

FIG. 10C is a three-dimensional plot of hole/slot open area versus X location and Y location for the overlapping first and second plates 140, 150 of FIGS. 2 and 3A, with data points for first through sixth zones of the second plate 150 when the first and second plates 140, 150 are in the third overlap configuration 158C as shown in FIGS. 7A and 7B. As shown in FIG. 10C, a large gradient of reduced hole/slot open area is provided in the first through fifth zones, while the hole/slot open area is substantially unchanged in the sixth zone.

Figure 10D:
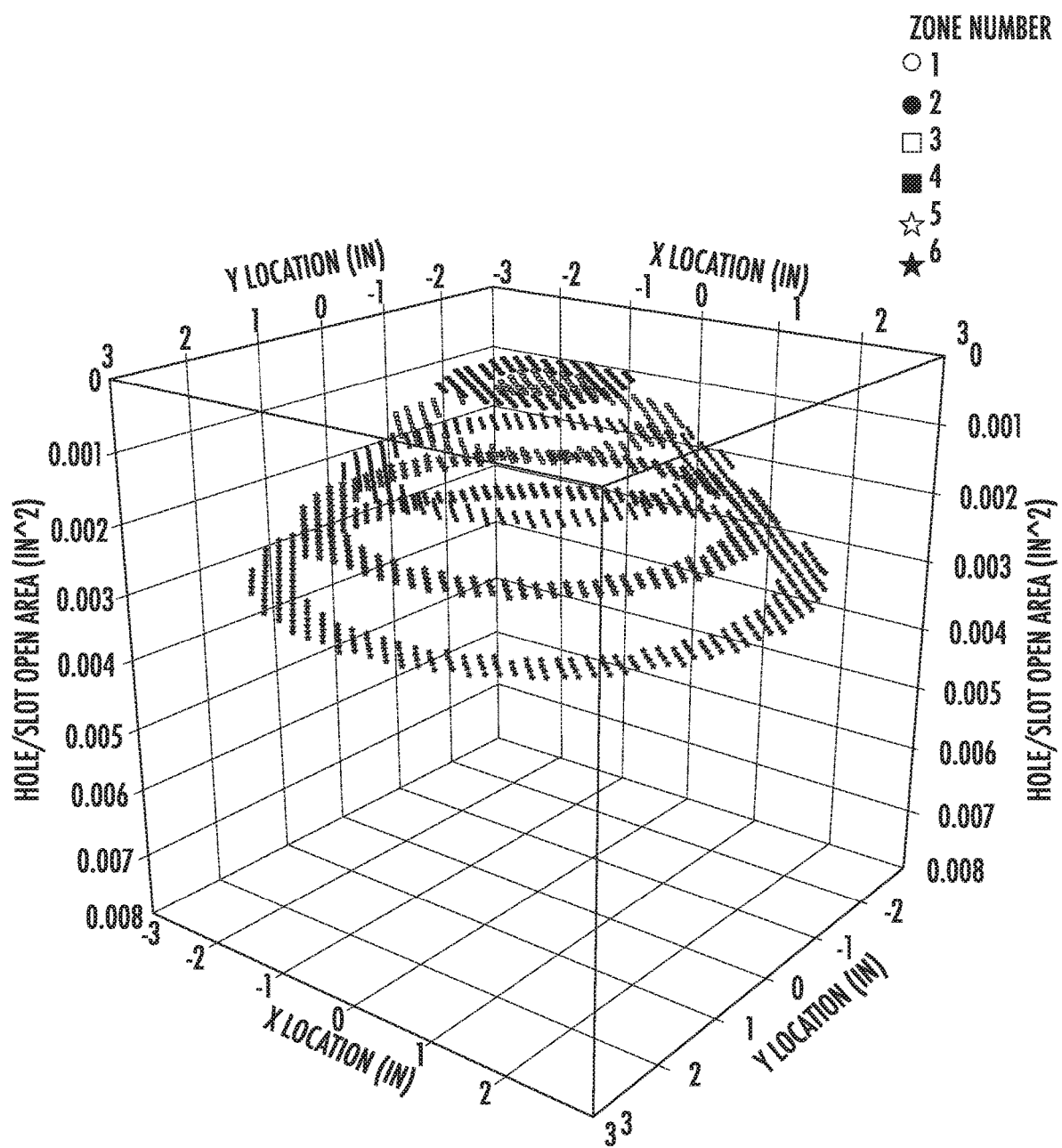
FIG. 10D is a three-dimensional plot of hole/slot open area versus X location and Y location for the overlapping first and second plates of FIGS. 2 and 3A, with data points for first through sixth zones of the second plate, when the plates are in the fourth overlap configuration shown in FIGS. 8A and 8B.

FIG. 10D is a three-dimensional plot of hole/slot open area versus X location and Y location for the overlapping first and second plates 140, 150 of FIGS. 2 and 3A, with data points for first through sixth zones of the second plate 150 when the first and second plates 140, 150 are in the fourth overlap configuration 158D as shown in FIGS. 8A and 8B. As shown in FIG. 10C, a reduced gradient of reduced hole/slot open area is provided in the first through sixth zones, with the first zone exhibiting zero hole/slot open area and the sixth zone exhibiting about a hole/slot open area that is less than half the value in FIG. 10A.

Figure 11:
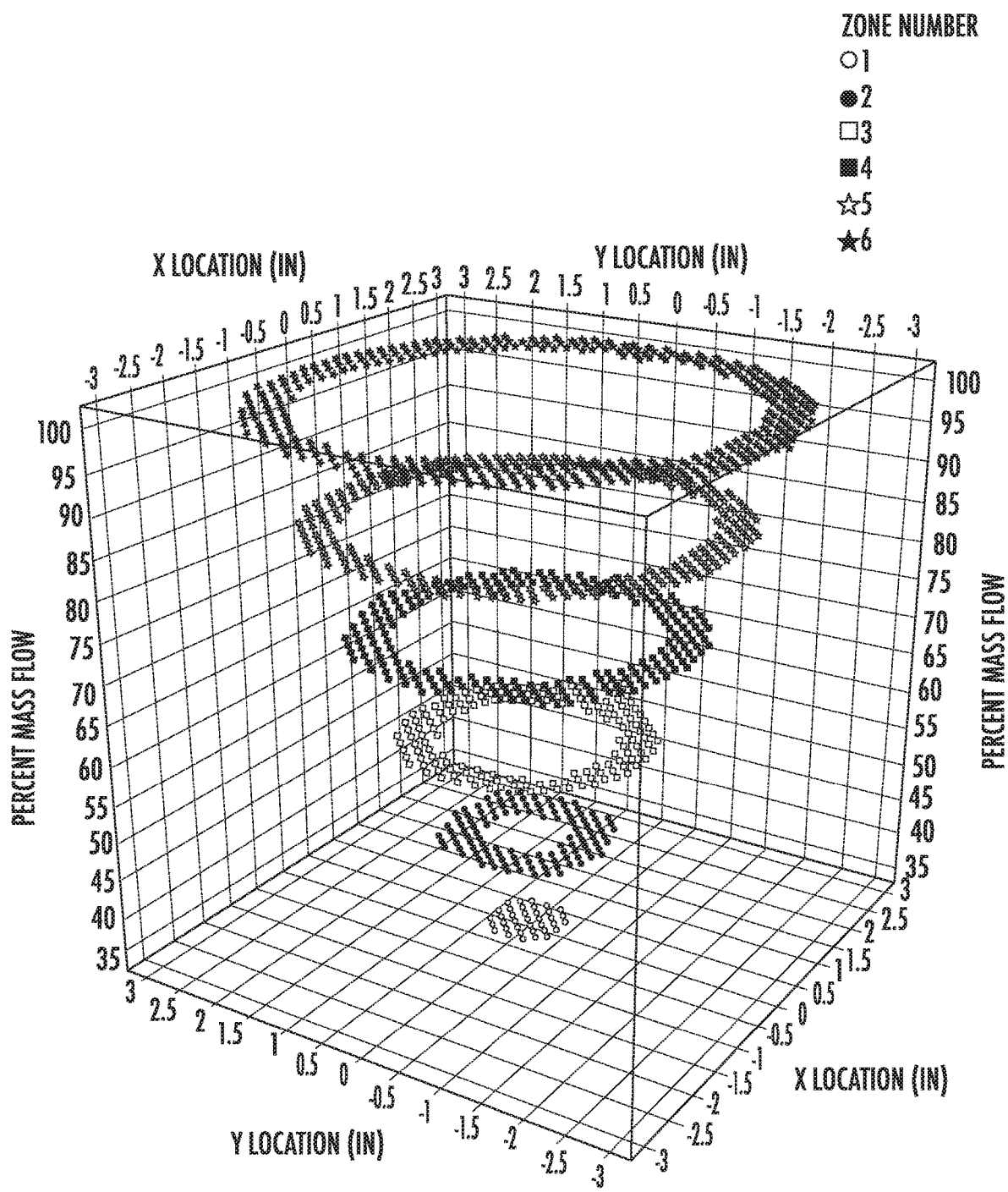
FIG. 11 is a three-dimensional plot of percent mass flow versus X location and Y location for the overlapping first and second plates of FIGS. 2 and 3A, with data points for first through sixth zones of the second plate, when the plates are in the second overlap configuration shown in FIGS. 6A and 6B.

FIG. 11 is a three-dimensional plot of percent mass flow versus X location and Y location for the overlapping first and second plates 140, 150 of FIGS. 2 and 3A, with data points for first through sixth zones of the second plate 150, when the first and second plates 140, 150 are in the second overlap configuration 158B shown in FIGS. 6A and 6B. Comparing the percent mass flow plot of FIG. 11 to the hole/slot open area plot of FIG. 10B, it is apparent that the percent mass flow is directly correlated to hole/slot open area, with greater hole/slot open area corresponding to greater mass flow, and vice-versa.

Although specific embodiments disclosed herein are particularly beneficial for use with workpieces having opposing circular end faces bounding a cylindrical sidewall, it is to be appreciated that gripping apparatuses disclosed herein may be used with workpieces of other shapes, such as: workpieces having one or more curved sidewalls; workpieces having at least one hemispherical or non-planar end face bounding a cylindrical sidewall; workpieces having one or more oval end faces bounding a cylindrical side wall; workpieces having workpieces having substantially polyhedral end faces (e.g., with six, seven, eight, nine, ten, eleven, twelve or more sides, optionally having rounded corners) and sidewalls of the same or similar shape, and the like.

Technical benefits that may be provided by embodiments of the present disclosure include one or more of the following: improved control of center-to-outer flow distribution of extrudate source material for production of honeycomb extrudate bodies; improved quality and consistency of honeycomb extrudate bodies; and improved yield in production of honeycomb extrudate bodies.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A system for controlling flow distribution of an extrudate source material upstream of an extrusion die configured for production of a honeycomb extrudate, the system comprising:
   a first plate defining a first plurality of openings; and
   a second plate defining a second plurality of openings, wherein at least some openings of the second plurality of openings arranged at different radial positions differ in area;
   wherein the first plate and the second plate are arranged in series in a flow path of extrudate source material to cause the extrudate source material to flow through either (i) the first plurality of openings followed by the second plurality of openings, or (ii) the second plurality of openings followed by the first plurality of openings; and
   wherein at least one of the first plate or the second plate is configured to move relative to the other by translation in a lateral direction that is perpendicular to a direction of flow of extrudate source material through the first plurality of openings and the second plurality of openings, and relative movement between the first plate and the second plate is configured to adjust a center-to-outer flow distribution of the extrudate source material through the extrusion die.

2. The system of claim 1, wherein openings of the second plurality of openings are distributed among a central zone, a peripheral zone, and at least one intermediate zone that is arranged between the central zone and the peripheral zone, with each of the peripheral zone and the at least one intermediate zone surrounding the central zone.

3. The system of claim 2, wherein individual openings of the second plurality of openings arranged in the peripheral zone are larger than individual openings of the second plurality of openings arranged in the at least one intermediate zone, and individual openings of the second plurality of openings arranged in the at least one intermediate zone are larger than individual openings of the second plurality of openings arranged in the central zone.

4. The system of claim 3, wherein the at least one intermediate zone comprises a plurality of intermediate zones including an outermost intermediate zone and an innermost intermediate zone, and wherein the outermost intermediate zone comprises individual openings of the second plurality of openings that are larger than individual openings of the second plurality of openings provided in the innermost intermediate zone.

5. The system of claim 2, wherein individual openings of the second plurality of openings arranged in the central zone are circular in shape, and individual openings of the second plurality of openings arranged in the peripheral zone and arranged in the at least one intermediate zone comprise geometric stadium shapes.

6. The system of claim 1, wherein each of the first plate and the second plate extends across substantially an entire width of a single flow path of the extrudate source material upstream of the extrusion die.

7. The system of claim 1, further comprising at least one mechanism configured to move one of the first plate or the second plate.

8. The system of claim 7, wherein each of the first plate and the second plate is substantially circular in shape.

9. A method for fabricating a honeycomb extrudate, the method comprising:
flowing an extrudate source material through a serial flow path including a first plurality of openings defined in a first plate and including a second plurality of openings defined in a second plate, wherein at least some openings of the second plurality of openings arranged at different radial positions differ in area; and
effectuating relative movement between the first plate and the second plate to adjust a center-to-outer flow distribution of extrudate source material through an extrusion die arranged downstream of the first plate and the second plate,
wherein the effectuating of relative movement between the first plate and the second plate comprises translating one of the first plate or the second plate in a lateral direction that is perpendicular to a direction of flow of extrudate source material through the first plurality of openings and the second plurality of openings.

10. The method of claim 9, wherein the extrudate source material comprises a ceramic material.

11. The method of claim 9, wherein the serial flow path causes the extrudate source material to flow through the second plurality of openings followed by the first plurality of openings.

12. The method of claim 9, wherein the serial flow path causes the extrudate source material to flow through the first plurality of openings followed by the second plurality of openings.

13. The method of claim 9, wherein openings of the second plurality of openings are distributed among a central zone, a peripheral zone, and at least one intermediate zone that is arranged between the central zone and the peripheral zone, with each of the peripheral zone and the at least one intermediate zone surrounding the central zone.

14. The method of claim 13, wherein individual openings of the second plurality of openings arranged in the peripheral zone are larger than individual openings of the second plurality of openings arranged in the at least one intermediate zone, and individual openings of the second plurality of openings arranged in the at least one intermediate zone are larger than individual openings of the second plurality of openings arranged in the central zone.

15. The method of claim 14, wherein the at least one intermediate zone comprises a plurality of intermediate zones including an outermost intermediate zone and an innermost intermediate zone, and wherein the outermost intermediate zone comprises individual openings of the second plurality of openings that are larger than individual openings of the second plurality of openings provided in the innermost intermediate zone.

16. The method of claim 9, wherein each of the first plate and the second plate extends across substantially an entire width of a single flow path of the extrudate source material upstream of the extrusion die.

* * * * *